United States Patent
Tadge

(10) Patent No.: US 12,244,770 B2
(45) Date of Patent: Mar. 4, 2025

(54) CONFERENCING SYSTEM, SERVER, INFORMATION PROCESSING DEVICE AND NON-TRANSITORY RECORDING MEDIUM

(71) Applicant: Konica Minolta, Inc., Tokyo (JP)

(72) Inventor: Apeksha Tadge, Toyohashi (JP)

(73) Assignee: KONICA MINOLTA, INC., Tokyo (JP)

(*) Notice: Subject to any disclaimer, the term of this patent is extended or adjusted under 35 U.S.C. 154(b) by 9 days.

(21) Appl. No.: 17/751,821

(22) Filed: May 24, 2022

(65) Prior Publication Data
US 2022/0377177 A1 Nov. 24, 2022

(30) Foreign Application Priority Data
May 24, 2021 (JP) ................... 2021-086926

(51) Int. Cl.
*H04M 3/00* (2024.01)
*H04L 12/66* (2006.01)
(Continued)

(52) U.S. Cl.
CPC .......... *H04M 3/566* (2013.01); *H04M 3/567* (2013.01); *H04N 7/152* (2013.01)

(58) Field of Classification Search
CPC .......... H04N 7/15; H04N 7/147; H04N 7/152; H04N 7/157; H04N 23/62; H04N 23/90; H04N 23/631; H04N 21/4821; H04N 21/4314; H04L 65/403; H04L 12/1822; H04L 12/1818; H04L 67/306; H04M 3/567; H04M 3/56; H04M 2201/38; H04M 3/42059; H04M 1/72403; H04M 1/27475; H04M 2250/16; H04M 1/576
See application file for complete search history.

(56) References Cited

U.S. PATENT DOCUMENTS 11,057,720 B1* 7/2021 Frieding .............. H04R 25/407
2002/0023133 A1* 2/2002 Kato ....................... H04N 7/147
715/753
(Continued)

FOREIGN PATENT DOCUMENTS

JP 2014165565 9/2014

*Primary Examiner* — Kharye Pope
(74) *Attorney, Agent, or Firm* — BakerHostetler

(57) ABSTRACT

A conferencing system that is connected to multiple information processing devices over a network and provides each of the multiple information processing devices with a conference screen, comprises: a first participant information obtaining unit that obtains first participant information corresponding to a first participant who participates in a video conference by using each of the multiple information processing devices; a second participant information obtaining unit that obtains second participant information related to a second participant who indirectly participates in the video conference together with the first participant; and a display controller that: displays the first participant information obtained by the first participant information obtaining unit in a predetermined display area on the conference screen; and displays the second participant information obtained by the second participant information obtaining unit in the predetermined display area on the conference screen.

34 Claims, 16 Drawing Sheets

(51) Int. Cl.
*H04M 3/56* (2006.01)
*H04M 5/00* (2006.01)
*H04N 7/15* (2006.01)

(56) References Cited

U.S. PATENT DOCUMENTS

| | | | | |
|---|---|---|---|---|
| 2005/0099492 | A1* | 5/2005 | Orr | H04N 7/147 |
| | | | | 348/E7.083 |
| 2008/0129816 | A1* | 6/2008 | Mattila | H04N 7/147 |
| | | | | 348/E7.083 |
| 2010/0073454 | A1* | 3/2010 | Lovhaugen | G06F 3/0486 |
| | | | | 348/E7.083 |
| 2011/0292162 | A1* | 12/2011 | Byun | H04N 7/15 |
| | | | | 348/14.08 |
| 2013/0063542 | A1* | 3/2013 | Bhat | H04L 12/1822 |
| | | | | 348/E7.083 |
| 2013/0091205 | A1* | 4/2013 | Kotler | H04L 67/54 |
| | | | | 709/204 |
| 2013/0198635 | A1* | 8/2013 | Jones | G06F 3/0486 |
| | | | | 715/727 |
| 2013/0297409 | A1* | 11/2013 | Jones | H04L 12/1827 |
| | | | | 705/14.71 |
| 2016/0142462 | A1* | 5/2016 | Johnston | G10L 17/00 |
| | | | | 709/205 |
| 2016/0359941 | A1* | 12/2016 | Kvaal | H04N 7/147 |
| 2018/0203577 | A1* | 7/2018 | Astavans | H04N 7/152 |
| 2021/0407520 | A1* | 12/2021 | Neckermann | G10L 17/16 |
| 2022/0067092 | A1* | 3/2022 | Isaacs | G06F 16/735 |
| 2022/0311632 | A1* | 9/2022 | Daga | H04L 12/1818 |
| 2024/0064271 | A1* | 2/2024 | Murata | H04N 7/152 |

* cited by examiner

CONFERENCING SYSTEM 1

CONFERENCING SYSTEM, SERVER, INFORMATION PROCESSING DEVICE AND NON-TRANSITORY RECORDING MEDIUM

This application claims priority to Japanese patent application No. 2021-086926 filed on May 24, 2021, the entire disclosure of which is incorporated herein by reference.

BACKGROUND

Technological Field

The present invention relates to a conferencing system, a server, an information processing device and a non-transitory recording medium. One or more embodiments of the present invention more specifically relate to a technique for supporting a video conference with multiple participants.

Description of the Related Art

A video conferencing system that directly connects between multiple locations over a network and conducts a teleconference among the locations. This type of the video conferencing system places a camera and a screen in a conference room of each location and distributes a scenery image in the conference room photographed by the camera. The teleconferencing system also displays the scenery image photographed in another conference room on the screen. The participants of the conference see the image displayed on the screen so that they can know how it is in another conference room.

The aforementioned teleconferencing system had a problem that it is difficult to identify who is speaking by seeing the image displayed on the screen when one of participants in another conference room speaks. A conferencing system that identifies a speaker based on a directivity of a voice once a microphone placed in the conference room detects the voice. The conferencing system marks the image of the participant identified as the speaker and displays the image. This known technique is introduced for example in Japanese Patent Application Laid-Open No. JP 2014-165565 A.

On the other hand, as more people have been working from home, an environment that connects the multiple information processing devices including personal computers and/or tablet terminals with each other through a server for video conferences and enables multiple users who use the information processing devices to have a video conference has been established little by little. Nowadays, the participant who participates in the video conference uses his or her information processing device to log into the server, and connect to a video conference platform provided by the server. Once the information processing device connects to the video conference platform, the information processing device starts up a camera equipped therewith and sends an image of the participant to the server. The server distributes the image to each information processing device, and enables each information processing device to display the image of every participant logging into the server and participating in the video conference on each information processing device.

As described above, multiple information processing devices connect to the server for video conference and video conferences are often conducted. In some cases, a conference room is used in at least one of locations, and multiple participants gather in the conference room to have the video conference. In such a case, at least one person brings the information processing device to the conference room so that the other participants can share and see the screen displayed on the information processing device. The other participants who are participating in the video conference are enabled to be recognized Thus, it is not necessary for all of the multiple participants who participate in the video conference in the conference room to bring their information processing devices.

However, all the participants who participate in the conference room are not shown on the information processing devices of the participants who participate in the video conference at the locations different from the conference room. It is difficult for the participants who participate in the video conference at the location different from the conference room to identify who is participating in the conference.

The conventional teleconferencing system does not enable identification of each of the multiple participants who participate in the conference room. Moreover, the conventional teleconferencing system is not enabled to the video conferencing platform provided by the server. The conventional video conferencing system does not solve the above problem.

SUMMARY

One or more embodiments provide a conferencing system, a server, an information processing device and a non-transitory recording medium that enable participants who participate in a video conference in a location different from a conference room to identify participants who participate in the conference room and enhance the smooth video conference.

In one aspect, the present invention is directed to a conferencing system that is connected to multiple information processing devices over a network and provides each of the multiple information processing devices with a conference screen.

According to an aspect of the present invention, the conferencing system comprises: a first participant information obtaining unit that obtains first participant information corresponding to a first participant who participates in a video conference by using each of the multiple information processing devices; a second participant information obtaining unit that obtains second participant information related to a second participant who indirectly participates in the video conference together with the first participant; and a display controller that: displays the first participant information obtained by the first participant information obtaining unit in a predetermined display area on the conference screen; and displays the second participant information obtained by the second participant information obtaining unit in the predetermined display area on the conference screen.

In another aspect, the present invention is directed to a server that is connected to multiple information processing devices over a network and provides each of the multiple information processing devices with a conference screen, thereby supporting a video conference.

According to an aspect of the present invention, the server comprises: a first participant information obtaining unit that obtains first participant information corresponding to a first participant who participates in the video conference by using one of the multiple information processing devices; a second participant information obtaining unit that obtains second participant information related to a second participant who indirectly participates in the video conference together with the first participant; and a display controller that: displays the first participant information obtained by the first participant information obtaining unit in a predetermined display area on the conference screen; and displays the second participant information obtained by the second participant information obtaining unit in the display area on the conference screen.

In another aspect, the present invention is directed to an information processing device that is connected to a server over a network and conducts a video conference using a platform for a video conference provided by the server.

According to an aspect of the present invention, the information processing device comprises: a first participant information generator that: generates first participant information corresponding to a first participant who participates in the video conference by using the information processing device; and transmits the first participant information to the server; a second participant information generator that: generates second participant information corresponding to a second participant who indirectly participates in the video conference together with the first participant; and transmits the second participant information to the server; a conference screen obtaining unit that obtains a conference screen in which the first participant information and the second participant information are arranged in a predetermined display area from the server; and a display unit that displays the conference screen obtained by the conference screen obtaining unit.

In another aspect, the present invention is directed to a non-transitory recording medium storing a computer readable program to be executed by a hardware processor in a server that is connected to multiple information processing devices over a network and provides each of the multiple information processing devices with a conference screen, thereby supporting a video conference.

According to an aspect of the present invention, the non-transitory recording medium storing a computer readable program to be executed by the hardware processor in the server causing the hardware processor to perform: obtaining first participant information corresponding to a first participant who participates in the video conference by using one of the multiple information processing devices; obtaining second participant information related to a second participant who indirectly participates in the video conference together with the first participant; displaying the obtained first participant information in a predetermined display area on the conference screen, and displaying the obtained second participant information in the predetermined display area on the conference screen.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

First Embodiment

Figure 1:
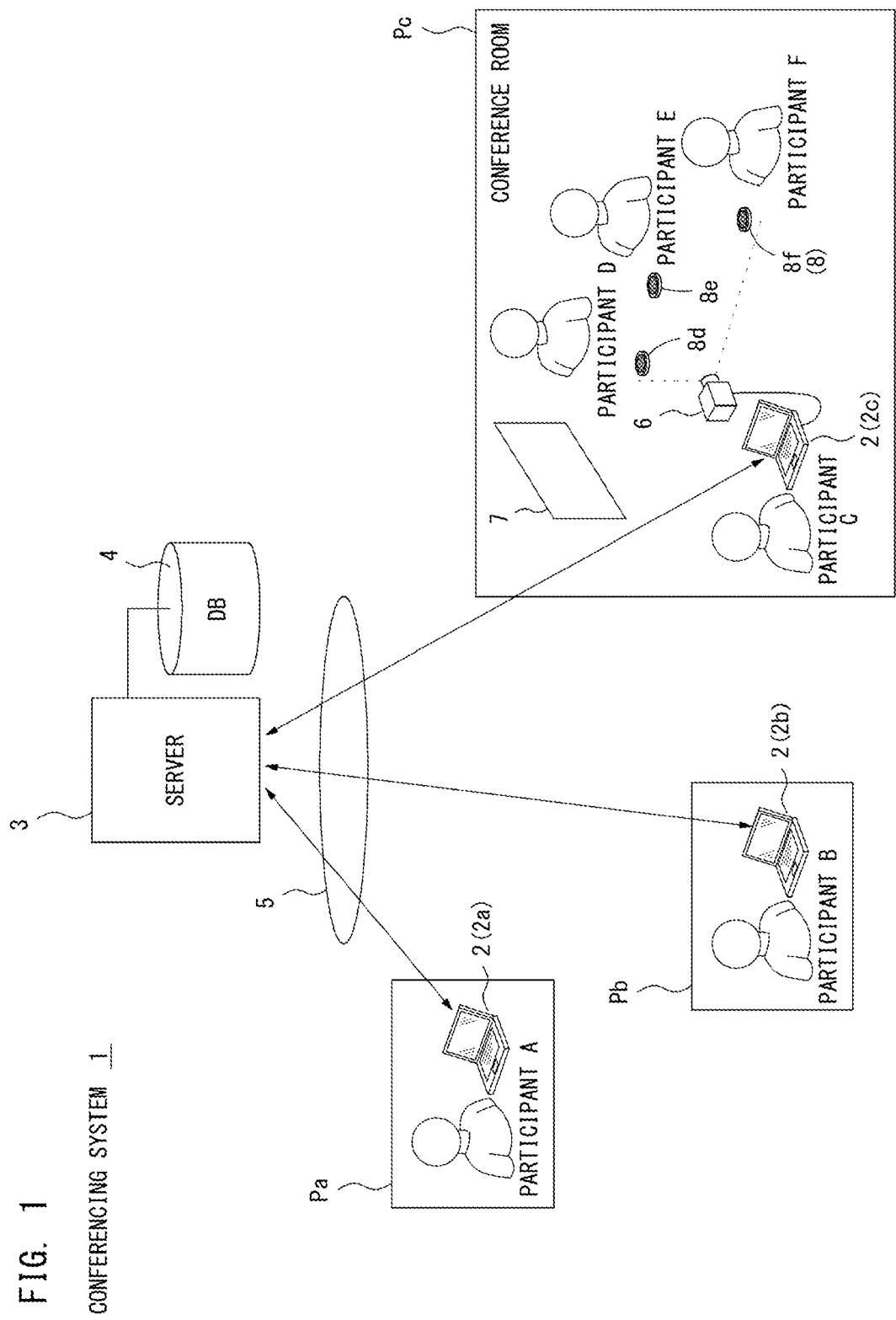
FIG. 1 illustrates an exemplary structure of a conferencing system.

FIG. 1 illustrates an exemplary structure of a conferencing system 1 in which the first embodiment of the present invention may be practiced. The conferencing system 1 connects multiple locations Pa, Pb and Pc over a network 5 and supports participants in each location Pa, Pb and Pc to conduct a video conference. The conferencing system 1 includes multiple information processing devices 2 (2a, 2b and 2c) used by participants who participate in the video conference in each location Pa, Pb and Pc, and a server 3. The server 3 is, for example, installed in a cloud on the Internet and is communicably connected to the information processing devices 2 in the respective locations Pa, Pb and Pc over the network 5 that includes the Internet. The information processing device 2 in each location Pa, Pb and Pc is indirectly connected to the other information processing devices 2 via the server 3 so that information can be exchanged with the other information processing devices 2. According to the present embodiment, the number of the locations connected to the server 3 is three. The number of the locations connected to the server 3 is not limited thereto, and may be two, or more than four. Also, the number of the information processing devices 2 connected to the server 3 does not have to be three, and may be two, or more than four.

The server 3 connects each of the multiple information processing devices 2 to one another via the network 5 and provides each of the multiple information processing devices 2 with a service for video conferences. For example, the server 3 has a web server function of providing a video conference platform. The server 3 provides each of the multiple information processing devices 2 connected to the video conference platform with a screen for a conference (hereafter, conference screen) and/or voice during the conference. For the conference screen, for example, there are functions of arranging and displaying images showing participants who participate in the video conference in each location Pa, Pb and Pc, and of displaying an image such as that of a document designated for sharing by at least one participant.

The server 3 includes a database 4. The database 4 is a storage in which information such as reservation information of video conferences and/or information for authenticating participants of the video conference is stored. The database 4 may be placed at a location different from the server 3 and connected to the server 3 via the network 5.

The information processing device 2 is a portable terminal apparatus used by the participant who participates in the video conference. The information processing device 2 is formed from a device, for example, a personal computer, a tablet terminal or a smartphone. This type of information processing device 2 generally includes a display unit, a camera, a microphone, and a speaker. The information processing device 2 connects to the server 3 via the network 5 and uses the video conference platform provided by the server 3 so that it carries out various types of processing for supporting the video conference. For example, the information processing device 2 is connected to the server 3 and activates the display part, the camera, the microphone, and the speaker so that the conference screen provided from the server 3 is enabled to be displayed and/or participants are enabled to communicate with participants in other locations.

In the present embodiment, as an example, a participant A uses his or her information processing device 2a to participate in the video conference at the location Pa. A participant B uses his or her information processing device 2b to participate in the video conference at the location Pb. At the location Pc, a participant C brings his or her own information processing device 2c into a conference room, and uses the information processing device 2c to participate in the video conference. In the present embodiment, other participants D, E and F participate in the video conference in addition to the participant C in the conference room at the location Pc. The participants D, E and F, however, do not bring the information processing devices 2 into the conference room, but share the information processing device 2 used by the participant C to indirectly participate in the video conference.

A camera 6 is installed in the conference room of the location Pc. The camera 6 is for photographing an image of the participants D, E and F who indirectly participate in the video conference in the conference room of the location Pc. Therefore, in the present embodiment, the camera 6 is installed in the conference room separately from the information processing device 2c so as to photograph the other participants D, E and F. The camera, for example, equipped with the information processing device 2c used by the participant C is arranged so as to photograph the participant C. It is difficult to photograph all of the other participants D, E and F in the conference room. Therefore, in the present embodiment, the camera 6 is installed in the conference room separately from the information processing device 2c to photograph the other participants D, E and F. The camera 6 is connected to, for example, the information processing device 2c. The camera 6 starts a photographing operation based on an instruction from the information processing device 2c, and outputs a photographed image to the information processing device 2c.

Further, a screen 7 and multiple microphones 8d, 8e and 8f are installed in the conference room of the location Pc. On the screen 7, the same screen as the conference screen displayed on the information processing device 2c is displayed. The screen 7, for example, may be a display device such as a large-screen display connected to the information processing device 2c, or may be a screen on which a conference screen is projected from a projection device such as a projector connected to the information processing device 2c. The microphones 8d, 8e and 8f are individually allocated to each of the participants D, E and F participating in the video conference without carrying the information processing devices 2. The microphones 8d, 8e and 8f are voice input units placed in the vicinity of each of the participants D, E and F.

The conferencing system 1 having the above-described structure recognizes the participants A, B and C who directly participate in the video conference using the information processing devices 2a, 2b and 2c as first participants (direct participants), and supports the first participants to smoothly conduct the video conference. The conferencing system 1 recognizes the participants D, E and F who indirectly participate in the video conference without using the information processing devices 2a, 2b and 2c as second participants (indirect participants) and treat the second participants in the same manner as the first participants, thereby supporting each of the first participants and the second participants to smoothly conduct the video conference.

Figure 2A:
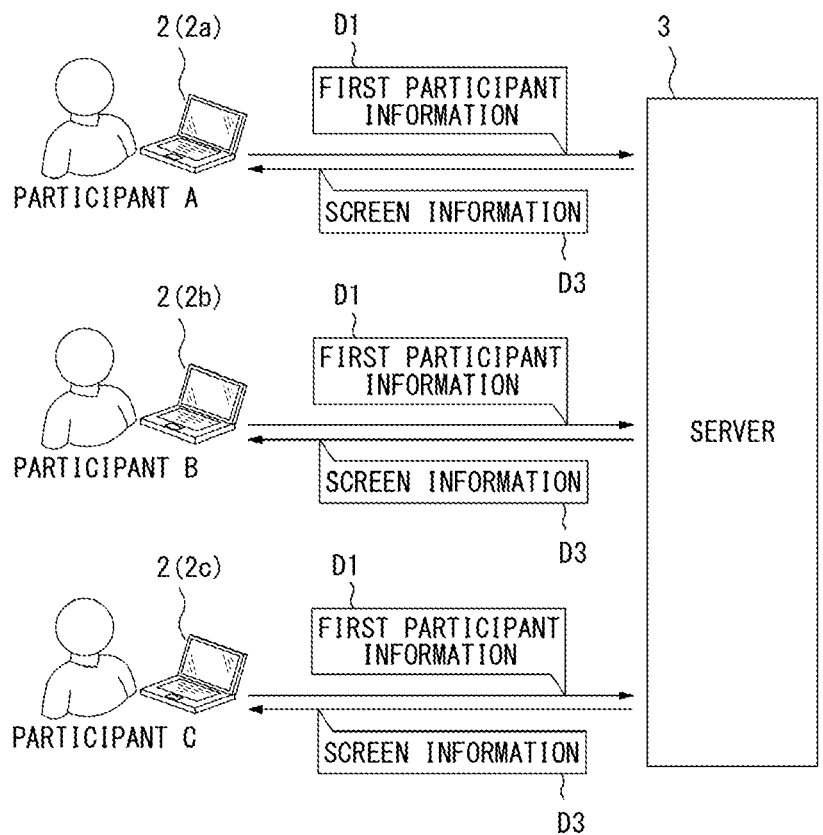
FIGS. 2A and 2B illustrate an example of information transmitted and received in the conferencing system.

For example, as illustrated in FIG. 2A, as connecting to the server 3, each of the information processing devices 2a, 2b and 2c generates first participant information D1 related to the respective participants A, B and C (the first participants) who directly participate in the video conference and transmits the first participant information D1 to the server 3. The first participant information D1 includes identification information with which the first participant can be identified. The identification information includes a name of the first participant. The name may be a full name, or something other than the full name such as an initial or a nickname.

Each information processing device 2a, 2b and 2c can transmit the first participant information D1 with including a first participant image showing the participant A, B or C (the first participant) to the server 3. For example, when a photographing function of the camera equipped with each information processing device 2a, 2b and 2c is set to be on, the information processing devices 2a, 2b and 2c are enabled to obtain a first photographed image (for instance, a moving image) obtained by photograph the participants A, B and C by the camera. Each information processing device 2a, 2b and 2c then generates the first participant image from the first photographed image, and transmits the first participant information D1 including the first participant image to the sever 3. However, the first participant image is not necessarily limited to the image generated from the first photographed image.

Based on the first participant information D1 obtained from each information processing device 2a, 2b and 2c, the sever 3 creates the conference screen to be displayed on each information processing device 2a, 2b and 2c and provides each information processing device 2a, 2b and 2c with screen information D3 related to the conference screen. At this time, the sever 3 arranges the first participant information D1 obtained from each information processing device 2a, 2b and 2c in a predetermined display area of the conference screen. The sever 3, for instance, creates a conference screen in which the first participant images showing the participants A, B and C and/or information such as the identification information of the participants A, B and C are arranged in the predetermined display area.

When the photographing function of the camera equipped with each information processing device 2a, 2b and 2c is set to be on, the first participant information D1 obtained from each information processing device 2a, 2b and 2c includes the first participant image based on the first photographed image obtained by photographing each participant A, B and C. The server 3, therefore, creates the conference screen in which the first participant images are arranged and provides each information processing device 2a, 2b and 2c with the conference screen.

When the photographing function of the camera equipped with each information processing device 2a, 2b and 2c is set to be off, the first participant information D1 obtained from each information processing device 2a, 2b and 2c does not include the first participant image based on the first photographed image obtained by photographing each participant A, B and C. In this case, the server 3 uses an image (for instance, an image such as a still image) determined in advance for each participant A, B and C as the first participant image that shows the corresponding participant A, B or C. The server 3 arranges the first participant images on the conference screen. The server 3 then provides each information processing device 2a, 2b and 2c with the conference screen on which the first participant images such as the still images are arranged.

The information processing devices 2a, 2b and 2c obtain the screen information D3 related to the conference screen from the sever 3, and displays the conference screen based on the screen information D3. The conference screen to be displayed includes the first participant information D1 about the participants A, B and C (the first participants) directly participating in the video conference using the respective information processing devices 2a, 2b and 2c. The participants A, B and C who are directly participating in the video conference using his or her information processing device 2 can recognize who is directly participating in the video conference in another location by seeing the conference screen.

Figure 2B:
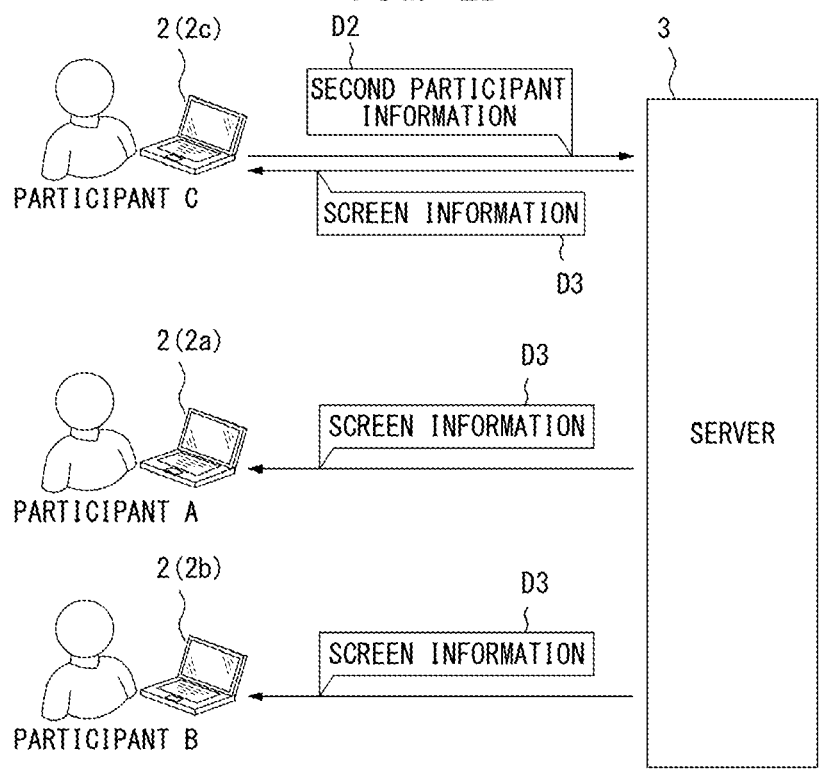

As illustrated in FIG. 2B, in addition to the first participant information, the information processing device 2c brought into the conference room by the participant C, generates second participant information D2 related to the participants D, E and F (the second participants) who indirectly participate in the video conference and transmit the generated second participant information D2 to the sever 3. The second participant information D2 includes identification information with which the second participant can be identified. For example, the identification information includes a name of the second participant. The name may be a full name, or something other than the full name such as an initial or a nickname. The identification information, for example, may be manually input to the information processing device 2c by the participant C who is using the information processing device 2c. In this case, the participant C manually inputs the identification information related to the multiple participants D, E and F individually. When the photographing function of the camera 6 connected to the information processing device 2c is set to be on, the second participant information D2 may not necessarily include the identification information as to the participants D, E and F. The participant C then does not have to manually input the identification information.

The information processing device 2c can transmit the second participant information D2 including a second participant image showing each participant D, E and F (the second participant) to the server 3. When the photographing function of the camera 6 connected to the information processing device 2c is set to be on, for example, the information processing device 2c can obtain a second photographed image (for instance, a moving image) obtained by photographing the participants D, E and F by the camera 6. The information processing device 2c then generates the second participant images from the second photographed image, and transmits the second participant information D2 including the second participant images to the sever 3. The second participant image is not necessarily limited to an image generated from the second photographed image.

Upon obtaining the second participant information D2 related to the participants D, E and F from the information processing device 2c, the sever 3 creates a conference screen in which the second participant information D2 is arranged in a predetermined display area similarly to the first participant information D1, and updates the screen information D3. Next, the sever 3 provides each information processing device 2a, 2b and 2c with the updated screen information D3. The sever 3 then generates the screen information D3 in which the second participant images showing the participants D, E and F (the second participants) are added to the conference screen, and provides the screen information D3 to each information processing device 2a, 2b and 2c. When the photographing function of the camera 6 connected to the information processing device 2c is set to be on, the second participant information 2c obtained from the information processing device 2C includes the second participant images based on the second photographed image obtained by photographing the participants D, E and F. The sever 3 creates the conference screen in which the second participant images are arranged and provides each information processing device 2a, 2b and 2c with the created screen.

When the photographing function of the camera equipped with the information processing device 2c is turned off, the second participant images based on the second photographed image obtained by photographing the participants D, E and F are not included in the second participant information 2c obtained from the information processing device D2. In this case, the sever 3 uses an image (for instance, an image such as a still image) predetermined for each participant D, E and F as the second participant image that shows the respective participants D, E and F and arranges the image on the conference screen. Then, the server 3 provides each information processing device 2a, 2b and 2c with the conference screen on which the second participant images such as the still image are arranged.

When the participants A and B who are participating in the video conference at the locations Pa and Pb different from the conference room of the location Pc view the conference screen displayed on the information processing devices 2a and 2b, the participants A and B can figure out the participants D, E and F who are indirectly participating in the video conference in the conference room of the location Pc. Hereinafter, such conferencing system 1 are described in more detail. In the following description, when the information processing devices 2a, 2b and 2c are not distinguished from each other, they may be collectively referred to as the information processing device 2.

Figure 3:
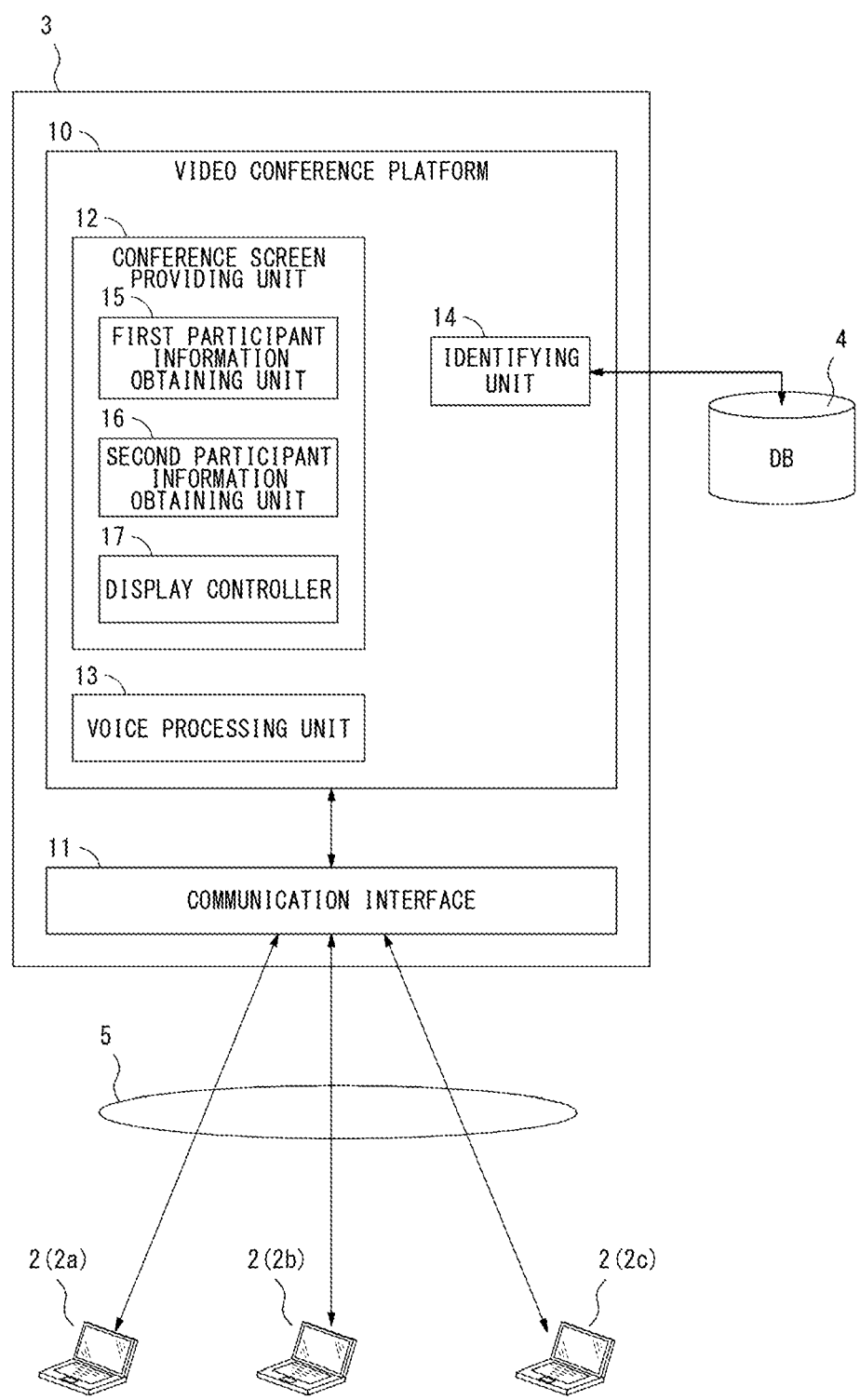
FIG. 3 is a diagram illustrating an exemplary structure of a server.

FIG. 3 is a diagram illustrating an exemplary structure of the server 3. The server 3 includes a video conference platform 10 and a communication interface 11. The video conference platform 10 is a software function realized by a hardware processor such as a CPU equipped with the server 3 executing a predetermined program. The video conference platform 10 communicates with each of the multiple information processing devices 2a, 2b and 2c, and carries out processing for supporting the video conference. The communication interface 11 is an interface for connecting the server 3 to the network 5 and communicating with each of the multiple information processing devices 2a, 2b and 2c.

The video conference platform 10 sets an address (for example, a URL (Uniform Resource Locator) for the video conference based on reservation information of the video conference registered in advance in the database 4, for example, and notifies each of the multiple information processing devices 2a, 2b and 2c registered in the reservation information of the address in advance. When the start time of the video conference approaches, the video conference platform 10 receives an access from each information processing device 2a, 2b and 2c, and establishes a connection with each information processing device 2a, 2b and 2c. The video conference platform 10 then starts processing for supporting the video conference. The video conference platform 10 includes a conference screen providing unit 12, a voice processing unit 13, and an identifying unit 14.

The conference screen providing unit 12 creates the conference screen shared by each of the multiple information processing devices 2, and provides each information processing device 2 with the conference screen, thereby supporting sharing of information between the locations. The conference screen providing unit 12 includes a first participant information obtaining unit 15, a second participant information obtaining unit 16, and a display controller 17. The first participant information obtaining unit 15 obtains the first participant information D1 transmitted from each of the multiple information processing devices 2a, 2b and 2c. Upon obtaining the first participant information D1, the first participant information obtaining unit 15 outputs the first participant information D1 to the display controller 17.

When the photographing function of the camera equipped with each information processing device 2a, 2b and 2c is turned on, the first participant information obtaining unit 15 continuously obtains, from each information processing device 2a, 2b and 2c, the first participant image generated based on the first photographed image. The first participant information obtaining unit 15 continuously outputs the first participant images obtained from the information processing devices 2a, 2b and 2c to the display controller 17.

The second participant information obtaining unit 16 obtains, from at least one information processing device 2c of the multiple information processing devices 2a, 2b and 2c, the second participant information D2 corresponding to the second participant who indirectly participates in the video conference together with the first participant. Upon obtaining the second participant information D2, the second participant information obtaining unit 16 outputs the second participant information D2 to the display controller 17. In addition, the second participant information obtaining unit 16 outputs the second participant information D2 to the identifying unit 14.

When the photographing function of the camera 6 connected to the information processing device 2c is turned on, the second participant information obtaining unit 16 continuously obtains, from the information processing device 2c, the second participant image generated based on the second photographed image. The second participant information obtaining unit 16 continuously outputs the second participant image obtained from the information processing device 2c to the display controller 17.

The display controller 17 obtains the first participant information D1 output from the first participant information obtaining unit 15 and creates the conference screen in which the first participant information D1 is arranged in the predetermined display area. After obtaining the second participant information D2 output from the second participant information obtaining unit 16, the display controller 17 creates the conference screen in which the second participant information D2 is arranged in the predetermined display area. Then, the display controller 17 provides each of the multiple information processing devices 2a, 2b and 2c with the conference screen in which each of the first participant information D1 and the second participant information D2 is arranged in the corresponding predetermined display area, and enables each information processing device 2a, 2b and 2c to display the conference screen.

For example, when the video conference is held in the manner shown in FIG. 1, the display controller 17 creates the conference screen in which the first participant images showing the participants A, B and C are arranged in the predetermined display area based on the first participant information D1 obtained from the information processing devices 2a, 2b and 2c, and transmits the conference screen to the information processing devices 2a, 2b and 2c. As a result, the conference screen including multiple images showing the respective participants A, B and C is displayed on each of the information processing devices 2a, 2b and 2c. If the photographing function of the camera equipped with each information processing device 2a, 2b and 2c is turned on, a real-time image (moving image) obtained by photographing the participants A, B and C is displayed on the conference screen.

Upon obtaining the second participant information D2 corresponding to each of the participants D, E and F from the information processing device 2c, the display controller 17 creates, based on the second participant information D2, the conference screen in which the second participant images each showing the respective participants D, E and F are arranged in the predetermined display area, and transmits the conference screen to the information processing devices 2a, 2b and 2c. As a result, on each of the information processing devices 2a, 2b and 2c, the conference screen including multiple images showing not only the participants A, B and C directly participating in the video conference but also the participants D, E and F indirectly participating in the video conference is displayed. If the photographing function of the camera 6 connected to the information processing device 2c is turned on, a real-time image (moving image) obtained by photographing the participants D, E and F is displayed on the conference screen.

The voice processing unit 13 processes voice for the conference. The voice processing unit 13 delivers voice collected at one location to the information processing device 2 at another location, thereby supporting a call performed between the locations. For example, upon obtaining voice information from one of multiple information processing devices 2, the voice processing unit 13 transmits the voice information to the other information processing devices 2 except the one information processing device 2 and enables the other information processing devices 2 to output the voice. Thus, the participants participating in the video conference at the other locations can hear the voice uttered at the one location.

When obtaining the second participant information D2 related to the second participant from at least one of the multiple information processing devices 2, the identifying unit 14 searches the database 4 based on the second participant information D2. The identifying unit 14 then identifies the second participant. When, for example, the second participant information D2 includes the second participant images based on the second photographed image, the identifying unit 14 searches the database 4 based on features of face images included in the second participant images, and identifies the participants D, E and F who are indirectly participating in the video conference. To be more specific, the identifying unit 14 extracts the face images of the participants D, E and F from the second participant images, and compares feature information registered in advance in the database 4 with the features of the face images extracted from the second photographed image to identify the participants D, E and F. The identifying unit 14 is also enabled to identify the names of the participants D, E and F who indirectly participate in the video conference as the second participants. Even when the identification information that can identify the second participant is not included in the second participant information D2, the identifying unit 14 is enabled to identify the name of the second participant.

When the identification information of the participants D, E and F is included in the second participant information D2, the identifying unit 14 identifies the names of the participants D, E and F on the basis of the identification information included in the second participant information D2. Therefore, the identifying unit 14 does not need to search the database 4 to identify the names of the participants D, E and F.

After identifying the second participant, the identifying unit 14 transmits a result of the identification to the information processing device 2c. After identifying the second participant, the identifying unit 14 also outputs the result of the identification to the conference screen providing unit 12.

Figure 4:
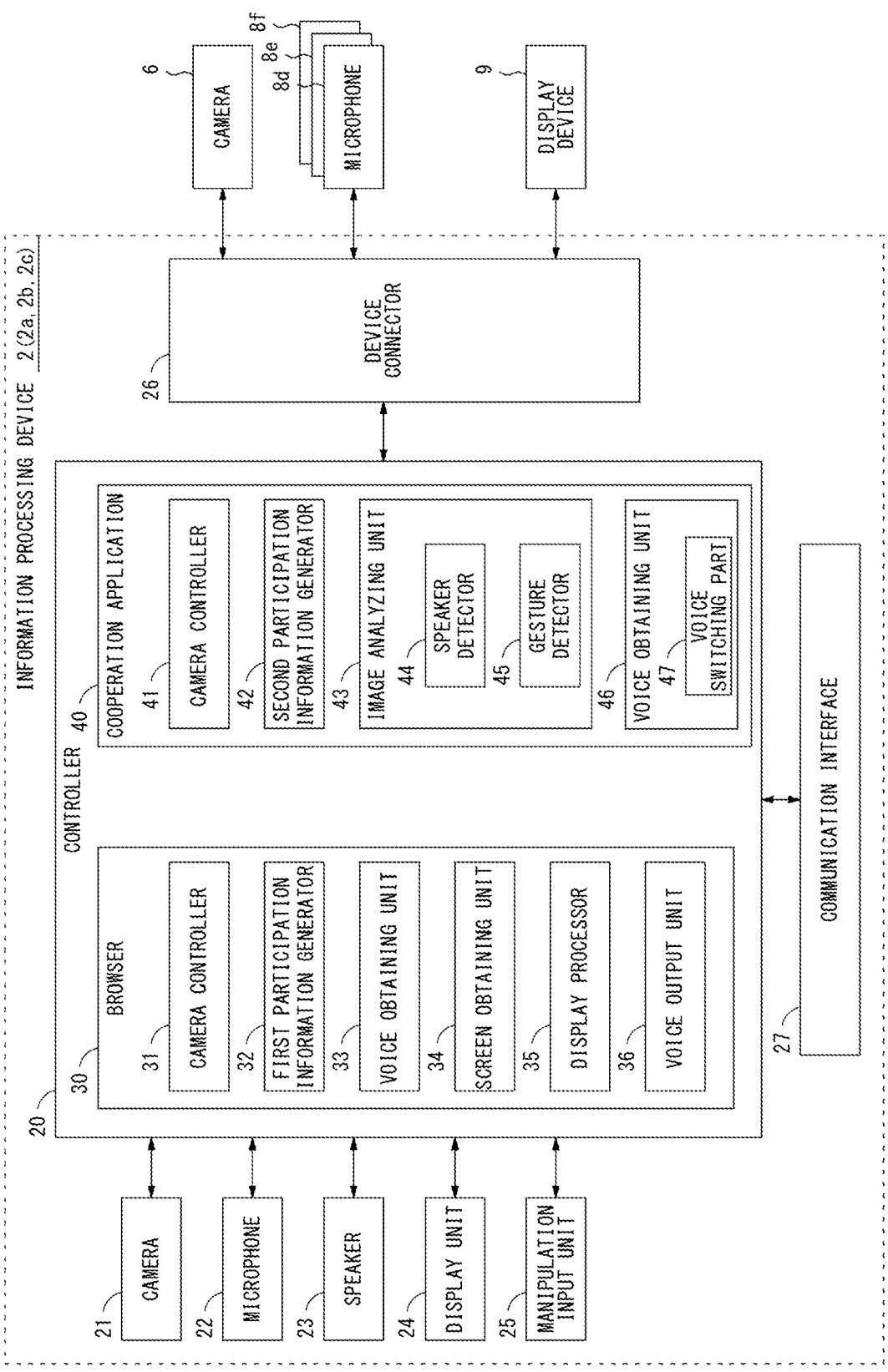
FIG. 4 is a diagram illustrating an exemplary structure of an information processing device.

FIG. 4 is a diagram illustrating an exemplary structure of the information processing device 2. The information processing devices 2a, 2b and 2c used in the respective locations Pa, Pb and Pc have the same structure. The information processing device 2 includes a controller 20, a camera 21, a microphone 22, a speaker 23, a display unit 24, a manipulation input unit 25, a device connector 26, and a communication interface 27.

The controller 20 includes a hardware processor such as a CPU and a memory. When the hardware processor executes a predetermined program, the controller 20 serves as a browser 30 and a cooperation application 40. The browser 30 is an application for browsing a Web page. The browser 30 accesses the server 3, and obtains the conference screen provided as the Web page from the server 3 and displays the conference screen on the display unit 24. The cooperation application 40 is an application that is started up in a state where the browser 30 has an access to the server 3. The cooperation application 40 works together with the server 3 and the browser 30 to execute processing for enabling the second participant to participate in the video conference.

The camera 21 is a photographing unit (first photographing unit). The information processing device 2 is equipped with the camera 21 around the display unit 24. The camera 21, for instance, is enabled to photograph the first participant who tries to view the conference screen displayed on the display unit 24.

The microphone 22 is a voice input unit equipped with the information processing device 2. For example, the microphone 22 inputs a voice uttered by the first participant who directly participates in the video conference using the information processing device 2, and generates the voice information.

The speaker 23 is a voice output unit equipped with the information processing device 2. For example, the speaker 23 outputs the voice based on the voice information provided from the server 3. The speaker 23 may be a device such as a headphone worn by the participant A, B or C.

The display unit 24 is a display unit formed by a display such as a color liquid crystal display. The display unit 24, for example, can display the conference screen provided by the server 3 on the display unit 24.

The manipulation input unit 25 is an operation input unit that receives an operation by the participant who uses the information processing device 2. The manipulation input unit 25 includes devices such as a keyboard, a mouse and a touch panel.

The device connector 26 is an interface for connecting an external device to the information processing device 2. The device connector 26, for example, includes a USB interface, a video output terminal, a video input terminal, and a voice input/output terminal. For the information processing device 2c brought into the conference room of the location Pc, the camera 6, the microphones 8d, 8e and 8f, and a display device 9 are connected to the device connector 26. The display device 9 is a device which enables the conference screen to be displayed on the screen 7 installed in the conference room of the location Pc.

The communication interface 27 connects the information processing device 2 to the network 5 and establishes communication with the server 3.

The browser 30 establishes a connection with the server 3, and executes program modules provided from the server 3 to serve as a camera controller 31, a first participant information generator 32, a voice obtaining unit 33, a screen obtaining unit 34, a display processor 35, and a voice output unit 36.

The camera controller 31 controls a photographing operation of the camera 21 equipped with the information processing device 2. When, for example, a photographing function of the camera 21 is set to be on, the camera controller 31 enables the camera 21 to start the photographing operation. Since the camera 21 is capable of photographing the first participant, the camera control unit 31 is enabled to obtain the first photographed image of the first participant by starting the photographing operation of the camera 21. The camera controller 31, for instance, obtains the first photographed image as the moving image. The camera control unit 31 then outputs the first photographed image to the first participant information generator 32. When the photographing function of the camera 21 is off, the camera control unit 31 does not enable the camera 21 to start photographing. In this case, the first photographed image is not obtained in the information processing device 2.

The first participant information generator 32 generates the first participant information D1 related to the first participant using the information processing device 2, and transmits the first participant information D1 to the sever 3. The first participant information generator 32, for example, identifies the first participant first. That is, the first participant information generator 32 identifies the first participant based on user information registered in advance in the information processing device 2. Then, the first participant information generator 32 generates the identification information with which the first participant can be identified. The identification information includes the name of the first participant. The first participant information generator 32 generates the first participant information D1 including the identification information related to the first participant.

The first participant information generator 32 also generates the first participant image showing the first participant who directly participates in the video conference by using the information processing device 2. The first participant information generator 32 then generates the first participant information D1 including the first participant image. When, for example, the photographing function of the camera 21 is on, the first participant information generator 32 obtains the first photographed image output from the camera controller 31. The first participant information generator 32 generates the first participant image showing the first participant on the basis of the first photographed image obtained by photographing the first participant. The first participant information generator 32 may generate the first participant image showing the first participant by using the first photographed image photographed by the camera 21 as it is, or may generate the first participant image showing the first participant by cutting out a part of the face image of the first participant from the first photographed image. The first participant information generation unit 32 may even generate an image in which the background portion of the first participant is replaced with another image or is blurred.

When, on the other hand, the photographing function of the camera 21 is off, the first participant information generator 32 cannot obtain the first photographed image to be obtained by photographing the first participant. In this case, the first participant information generator 32 may read an image (for example, a still image) predetermined by the user and use the image as the first participant image showing the first participant.

The first participant information generator 32 then transmits the first participant information D1 generated as described above to the sever 3. The first participant information generator 32 adds a command that enables the conference screen providing unit 12 of the server 3 to function, and transmits the first participant information D1.

The voice obtaining unit 33 obtains the voice information corresponding to the voice uttered by the first participant via the microphone 22. When the voice information of the first participant is obtained, the voice obtaining unit 33 transmits the voice information to the server 3. The voice obtaining unit 33 adds a command that enables the voice processing unit 13 of the server 3 to function, and transmits the voice information. The command includes the identification information with which the first participant can be identified.

The screen obtaining unit 34 obtains the conference screen provided from the server 3 in response to accessing the browser 30. Upon obtaining the conference screen, the screen obtaining unit 34 outputs the conference screen to the display processor 35.

The display processor 35 enables the conference screen obtained by the screen obtaining unit 34 to be displayed on the display unit 24. When the display device 9 is connected to the device connector 26, the display processor 35 enables the conference screen to also be displayed on the display device 9. Thus, for example, the participants D, E and F who indirectly participate in the video conference in the conference room of the location Pc can view the conference screen displayed on the screen 7 by the display device 9.

When the voice output unit 3 obtains the voice information from the server 3, the voice output unit 36 drives the speaker 23 based on the voice information, thereby outputting the voice uttered by the participant at another location.

The cooperative application 40 is started up in response to an instruction from the first participant using the information processing device 2, for example. The cooperation application 40 functions as a camera controller 41, a second participant information generator 42, an image analyzing unit 43, and a voice obtaining unit 46.

The camera controller 41 controls the photographing operation of the camera 6 connected to the device connector 26. When the photographing function of the camera 6 is, for example, set to ON, the camera controller 41 enables the camera 6 to start the photographing operation. Since the camera 6 is installed in a state capable of photographing the second participant, the camera controller 41 is enabled to obtain the second photographed image obtained by photographing the second participant by starting the photographing operation of the camera 6. For example, in the case of the information processing device 2c brought into the conference room of the location Pc, the camera controller 41 obtains the second photographed image obtained by photographing the participants D, E and F who indirectly participate in the video conference. The camera controller 41 obtains the second photographed image as a moving image. The camera controller 41 outputs the second photographed image to the second participant information generator 42.

The second participant information generator 42 generates the second participant information D2 related to the second participant who indirectly participates in the video conference, and transmits the second participant information D2 to the server 3. The second participant information generator 42 generates the second participant image showing the second participant who indirectly participates in the video conference by using the information processing device 2, and generates the second participant information D2 including the second participant image. When, for example, the photographing function of the camera 6 is on, the second participant information generator 42 obtains the second photographed image output from the camera controller 41. The second participant information generator 42 then generates the second participant image showing the second participant based on the second photographed image obtained by photographing the second participant. The second participant information generator 42 performs processing for extracting a face image from the second photographed image and identifying the participants D, E and F on the basis of the extracted face image. After the participants D, E and F can be identified, the second participant information generator 42 generates the second participant image showing each of the participants D, E and F on the basis of the second photographed image obtained by the camera controller 41. The second participant information generator 42 may use the second photographed image obtained by the camera 6 as it is as the second participant image showing the second participant, or may extract the face image of the second participant from the second photographed image and use the face image as the second participant image showing the second participant. The second participant information generator 42 may even generate an image in which the background portion of the second participant extracted from the second photographed image is replaced with another image or is blurred.

When the photographing function of the camera 6 is turned off, the second participant information generator 42 is not enabled to obtain the second photographed image obtained by photographing the second participant. In this case, the second participant information generator 42 may read the image (for example, a still image) designated by the user (for example, the participant C) who uses the information processing device 2, and use the read image as the second participant image showing the second participant.

The second participant information generator 42 is also enabled to display, for example, a screen on the display unit 24 with which the user is enabled to input the identification information with which the second participant can be identified, and receive an input operation for the identification information performed on the manipulation input unit 25. The second participant information generator 42 then is enabled to generate the identification information corresponding to the second participant. In the example of FIG. 1, the participant C using the information processing device 2c in the conference room at the location Pc manually inputs the identification information related to the other participants D, E and F. The second participant information generator 42 then obtains the identification information input by the participant C and generates the second participant information D2 including the obtained identification information. The second participant information generator 42 preferably generates the second participant information D2 in which the second participant image showing the second participant and the identification information are associated with each other. When the photographing function of the camera 6 is turned on, the second participant can be identified from the second photographed image as described above. In such a case, the second participant information generator 42 may omit the input operation of the identification information by the participant C.

When, for example, identifying the second participant based on the second photographed image, the second participant information generator 42 transmits, for example, the face image of the second participant extracted from the second photographed image to the server 3 as identification target information. The second participant information generator 42 adds a command to enable the identifying unit 14 of the server 3 to function and transmits the face image with the command Based on this command, the server 3 brings the identifying unit 14 into operation to search the database 4 based on the face image, and specifies the second participant included in the second photographed image. As a result, information such as the names of the participants D, E and F who indirectly participate in the video conference in the conference room of the location Pc is identified. The server 3 returns the identification result of the second participant to the information processing device 2. The second participant information generator 42 identifies the second participant included in the second photographed image based on the identification result received from the server 3.

The second participant information generator 42 then transmits the second participant information D2 in which the second participant image showing the second participant and the identification information including the name of the second participant are associated with each other to the server 3. The second participant information generator 42 adds a command for enabling the conference screen providing unit 12 of the server 3 to function and transmits the second participant information D2. When the photographing function of the camera 6 is turned on, the second participant information generator 42 outputs the second participant image generated from the second photographed image to the image analyzing unit 43.

The image analyzing unit 43 analyzes the second participant image output from the second participant information generator 42. The image analyzing unit 43 includes a speaker detector 44 and a gesture detector 45.

The speaker detector 44 detects a speaker from among the second participants identified by the second participant information generator 42. The speaker detector 44 extracts the face image from the second participant image generated on the basis of the second photographed image, and analyzes the face image so that a speaker is detected. The speaker detector 44, for instance, determines the movement of the mouth in the face image of the second participant and detects the speaker based on the determination result. When the second participant image includes face images of multiple second participants, the speaker detector 44 repeatedly performs the process of determining the movement of the mouth on each of the multiple face images. Therefore, if at least one of the multiple second participants speak, the speaker detector 44 is enabled to detect in real time who is speaking.

Upon detecting the speaker, the speaker detector 44 notifies the server 3 of the speaker. The speaker detector 44 adds a command to enable the conference screen providing unit 12 of the server 3 to function and transmits. This command includes the identification information with which the second participant detected as the speaker can be identified.

The gesture detector 45 detects that a hand raising gesture is performed by the second participant identified by the second participant information generator 42. The gesture detector 45 detects the hand raising gesture performed by the second participant based on the second participant image generated from the second photographed image. The gesture detector 45, for example, detects the hand raising gesture by detecting the movement of the hand around the face image of the second participant. In a case where the second participant image includes face images of the multiple second participants, the gesture detector 45 sets each of the multiple face images as a detection target and repeatedly performs a process of detecting the movement of the hand around the face image. Therefore, when at least one participant among the multiple second participants perform the hand raising gesture, the gesture detector 45 can detect who is performing the hand raising gesture in real time.

Upon detecting the hand raising gesture, the gesture detector 45 notifies the server 3 that the hand raising gesture has been performed. The gesture detector 45 adds a command for enabling the conference screen providing unit 12 of the server 3 to function and transmits. The command includes the identification information with which the second participant who has performed the hand raising gesture may be identified.

The voice obtaining unit 46 obtains the voice information corresponding to a voice uttered by the second participant via at least one of the multiple microphones 8d, 8e and 8f connected to the device connector 26. When the voice information of the second participant is obtained, the voice obtaining unit 46 transmits the voice information to the server 3. The voice obtaining unit 46 adds a command to enable the voice processing unit 13 of the server 3 to function and transmits the voice information. This command includes the identification information with which the second participant detected as the speaker by the speaker detector 44 may be identified.

The voice obtaining unit 46 includes a voice switching part 47. The sound switching part 47 performs on-off control of multiple microphones 8d, 8e and 8f. The voice switching part 47, for instance, stores in advance each of the multiple microphones 8d, 8e and 8f is installed near which participant of the multiple second participants. To achieve this, for example, the user (the participant C) who uses the information processing device 2c may register installation positions of the multiple microphones 8d, 8e and 8f in association with the participants D, E and F at the time of activation of the cooperation application 40. Then, the voice switching part 47 turns on the power of the microphone installed near the second participant detected as the speaker by the speaker detector 44 among the multiple microphones 8d, 8e and 8f, and turns off the power of the other microphones. Thus, the voice of the speaker can be obtained with the microphone closest to the speaker, and clear voice that is easy to hear can be obtained.

Figure 5:
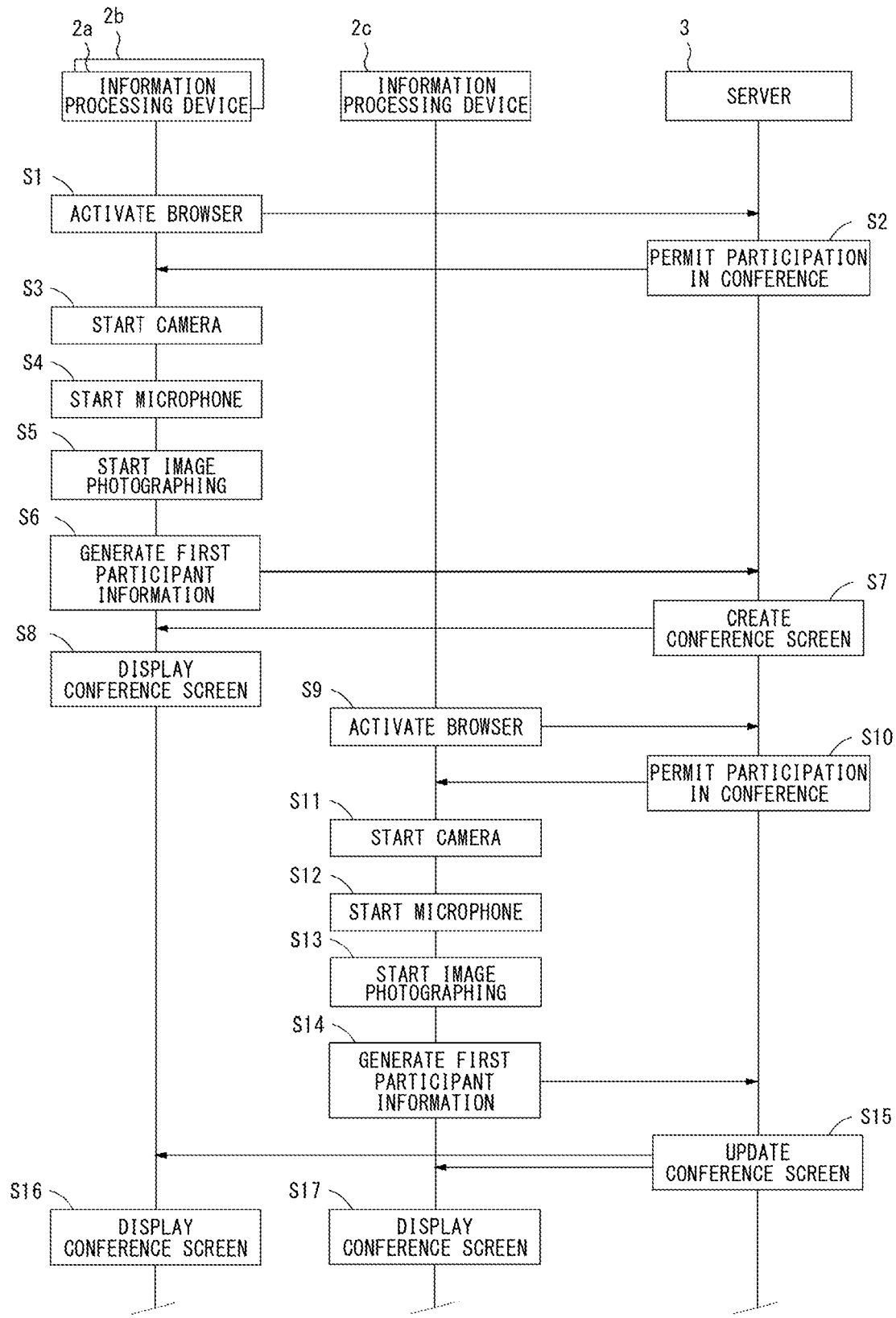
FIG. 5 is a first flow diagram illustrating an exemplary process sequence performed by the conferencing system.

Next, operations of the conferencing system 1 configured as described above are explained. FIG. 5 is a first flow diagram illustrating an exemplary process sequence performed by the conferencing system 1 according to the present embodiment. The first flow diagram illustrates a flow in which each participant A, B and C who directly participates in the video conference logs in to the server 3 using his/her information processing device 2a, 2b or 2c. First, when the start time of the video conference approaches, the participants A and B who directly participate in the video conference at the locations Pa, Pb operate the respective information processing devices 2a and 2b to activate the browser 30 and access the address notified in advance from the sever 3 (step S1). At this time, the browser 30 transmits the first participant information D1 including the identification information for identifying the participants A and B to the sever 3. Upon detecting the access from the information processing devices 2a and 2b, the server 3 authenticates whether or not the participant is registered in the reservation information based on the identification information of the participants A and B. As a result, when the authentication results in success, the sever 3 permits participation in the video conference and transmits the program module to the information processing devices 2a and 2b (step S2).

When the participation in the video conference is permitted by the sever 3, the information processing devices 2a and 2b start the camera 21 for photographing the participants A and B (step S3) and further starts the microphone 22 (step S4). Then, the browser 30 of the information processing devices 2a and 2b brings the camera controller 31 into operation to start image photographing by the camera 21 (step S5). Accordingly, the browser 30 of the information processing devices 2a and 2b brings the first participant information generator 32 into operation to generate the first participant image showing the participants A and B based on the first photographed image obtained by photographing the participants A and B. The browser 30 of the information processing devices 2a and 2b then transmits the first participant information D1 including the first participant image to the sever 3 (step S6). Since the participants A and B are not photographed when the photographing function of the camera 21 is turned off in the information processing devices 2a and 2b. The browser 30, therefore, uses the predetermined image as the first participant image and transmits the first participant information D1 including the images and the identification information of the participants A and B to the sever 3.

When the server 3 obtains the first participant information D1 related to the participants A and B from the information processing devices 2a and 2b, the server 3 brings the display controller 17 into operation to create the conference screen in which the first participant information D1 related to the participants A and B is arranged in the predetermined display area, and transmit the conference screen to the information processing devices 2a and 2b (step S7). The server 3 extracts the first participant images showing the participants A and B from the first participant information D1, and arranges the first participant images in the predetermined display region area. Upon obtaining the conference screen from the sever 3, the information processing devices 2a and 2b enables the display unit 24 to display the conference screen. Thus, the participants A and B are in a state of being able to have a conference while viewing the same conference screen.

Also at the location Pc, the participant C who directly participates in the video conference operates his or her information processing device 2c to activate the browser 30 and access an address notified in advance by the sever 3 (step S9). The browser 30 sends the first participant information D1 including the identification information for identifying the participant C to the sever 3. When the server 3 detects the access from the information processing device 2c, the server 3 authenticates whether the participant is registered in the reservation information on the basis of the identification information of the participant C. When the authentication results in success, the sever 3 permits the participation in the video conference and transmits the program module to the information processing device 2c (step S10).

When the participation in the video conference is permitted by the sever 3, the information processing device 2c activates the camera 21 for photographing the participant C (step S11). The information processing device 2c further activates the microphone 22 (step S12). The browser 30 of the information processing device 2c brings the camera controller 31 into operation to start photographing images with the camera 21 (step S13). Accordingly, the browser 30 of the information processing device 2c brings the first participant information generator 32 into operation, and generates the first participant image showing the participant C based on the first photographed image obtained by photographing the participant C. The browser 30 of the information processing device 2c then transmits first participant information D1 including the first participant image to the sever 3 (step S14). The participant C is not photographed when the photographing function of the camera 21 is turned off in the information processor 2c. The browser 30, therefore, uses the predetermined image as the first participant image and transmits the first participant information D1 including the image and the identification information of the participant C to the sever 3.

Upon obtaining the first participant information D1 related to the participant C from the information processing device 2c, the sever 3 enables the display controller 17 into operation to generate the conference screen in which the first participant information D1 related to the participant C is arranged in the predetermined display area and transmit the conference screen to the information processing devices 2a, 2b and 2c (step S15). The sever 3 extracts the first participant image showing the participant C from the first participant information D1, and arranges the first participant image in the predetermined display area. When the information processing devices 2a and 2b obtains the conference screen to which the information related to the participant C is added in the server 3, the information processing devices 2a and 2b enable the display unit 24 to display the conference screen (step S16). Upon obtaining the conference screen from the sever 3, the information processing device 2c enables the display unit 24 to display the conference screen (step S17). As a result, the participants A, B and C are able to have the conference while viewing the same conference screen.

Figure 6:
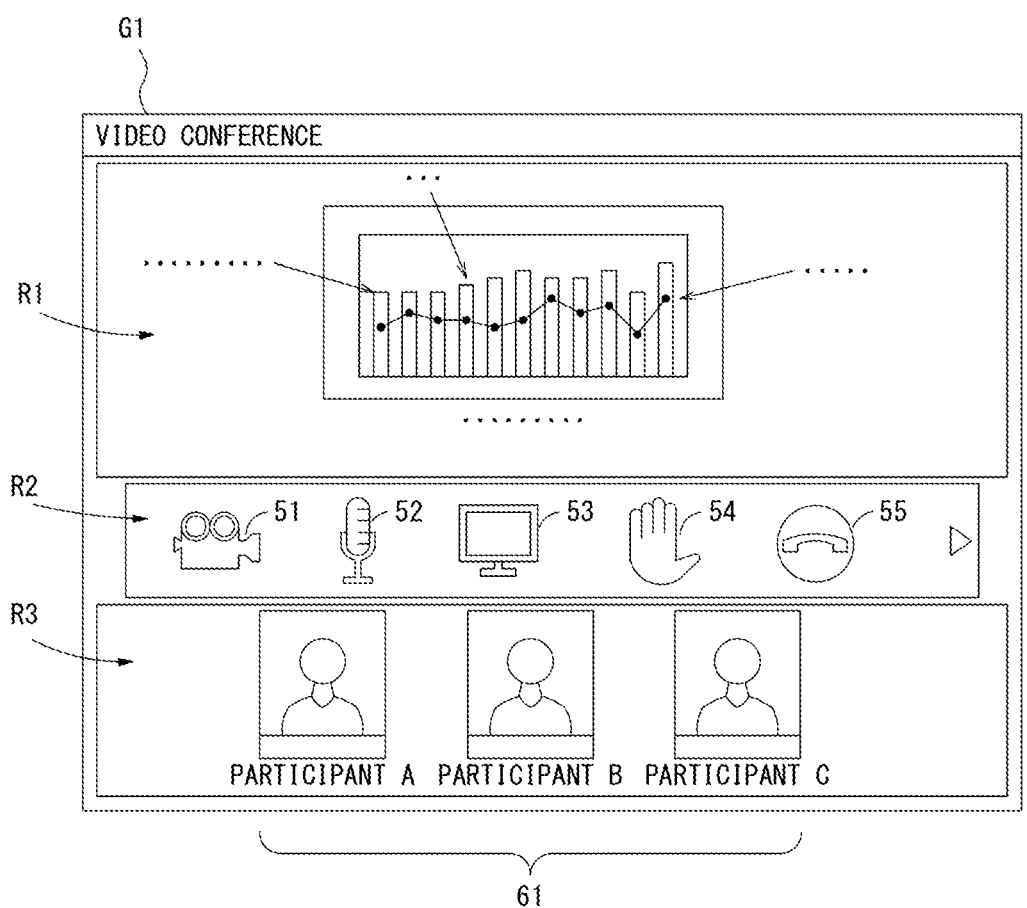
FIG. 6 illustrates an example of a conference screen in which a first participant is displayed.

FIG. 6 illustrates an example of a conference screen G1 displayed on the display unit 24 of the respective information processing devices 2a, 2b and 2c as described above. The conference screen G1 includes a material display area R1, an icon display area R2 and a participant display area R3. In the material display area R1, information such as materials used in the conference is displayed. In the icon display area R2, icons that can be operated by the participants A, B and C using the information processing devices 2a, 2b and 2c are displayed. In the participant display area R3, information based on the first participant information D1 and the second participant information D2 is displayed.

In the material display area R1, a material image specified to be shared and browsed in at least one of the multiple information processing devices 2a, 2b and 2c is displayed. It is assumed, for example, the participant A operates his or her information processing device 2a to specify sharing of the material image. In this case, the material image is transmitted from the information processing device 2a to the sever 3. Upon obtaining the material image from the information processing device 2a, the sever 3 brings the conference screen providing unit 12 into operation to create the conference screen G1 in which the material image is arranged in the material display area R1 and distribute the conference screen G1 to each information processing device 2a, 2b and 2c.

In the icon display area R2, multiple icons 51 to 55 that are operable by the participants A, B and C using the respective information processing devices 2a, 2b and 2c are displayed. For example, the participants A, B and C can perform operations such as on-off switching of the camera 21, on-off switching of the microphone 22 and a hand raising gesture by operating the icons 51 to 55.

In the participant display area R3, a list of information on participants who participate in the video conference is displayed. In the example of FIG. 6, a first participant image 61 showing each of the participants A, B and C directly participating in the video conference is displayed in the participant display area R3. To arrange the first participant image obtained from the information processing devices 2a, 2b and 2c in the participant display area R3, the display controller 17 of the server 3 adds the names of the participants A, B and C. As a result, in the participant display area R3 of the conference screen G1 displayed in each information processing device 2a, 2b and 2c, the names of the participants A, B and C are displayed together with the first participant images 61 corresponding to the respective participants A, B and C. Therefore, the participants A, B and C participating in the video conference at each location Pa, Pb and Pc can identify who participates in the video conference.

Figure 7:
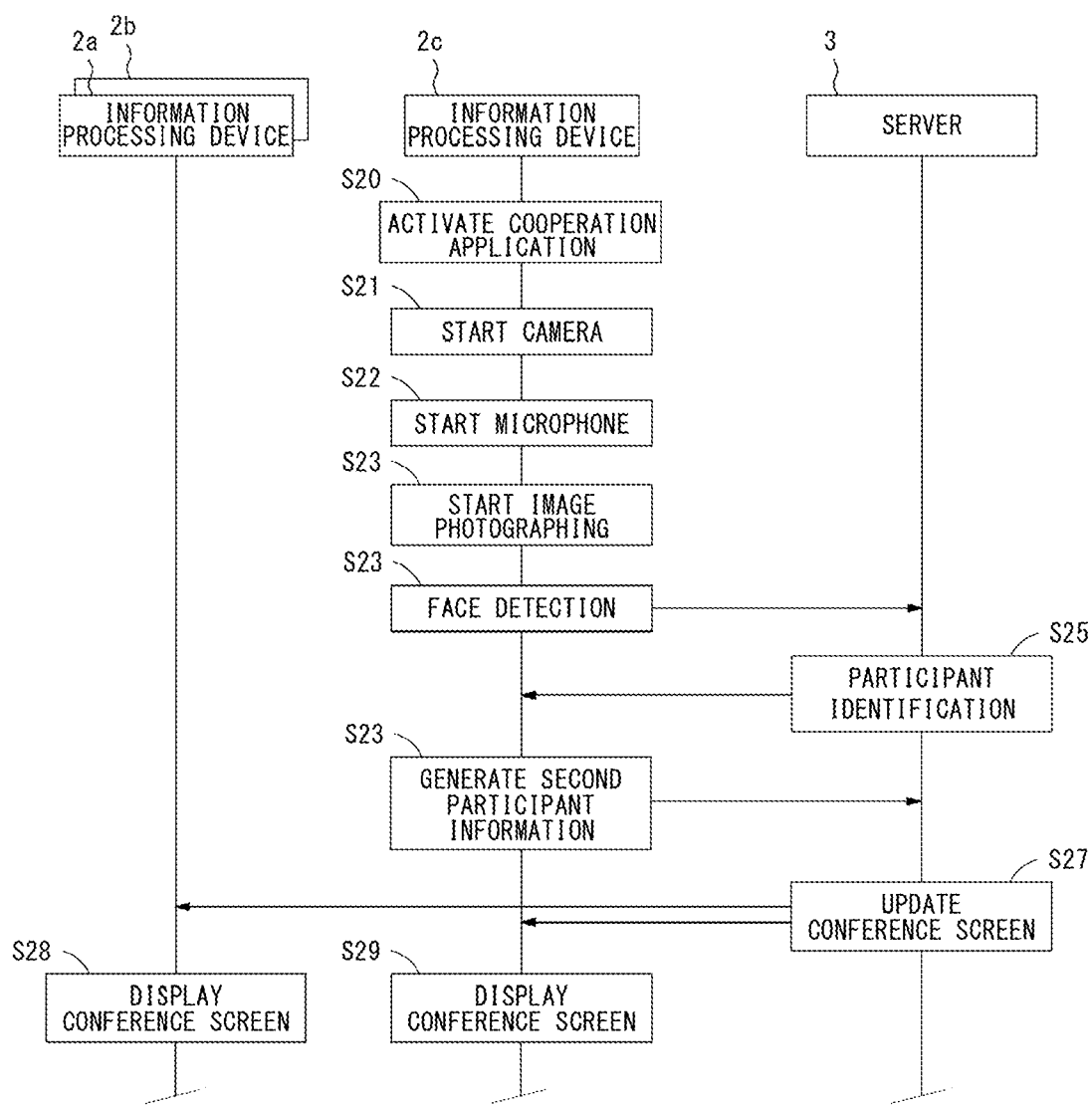
FIG. 7 is a second flow diagram illustrating an exemplary process sequence performed by the conferencing system.

Next, FIG. 7 is a second flow diagram illustrating an exemplary process sequence performed by the conferencing system 1 according to the present embodiment. The second flow diagram shows a flow of additionally displaying, as participants, the participants D, E and F that indirectly participate in the video conference in a state in which the participants A, B and C log in the server 3. The participant C who directly participates in the video conference in the conference room of the location Pc starts the cooperation application 40 by operating his or her own information processing device 2c (step S20). The cooperation application 40 starts the camera 6 connected to the device connector 26 (step S21) and further starts the microphones 8d, 8e and 8f (step S22). The cooperation application 40 then enables the camera controller 41 to function and starts the image photographing by the camera 6 (step S23). As a result, the information processing device 2c obtains the second photographed image obtained by photographing the participants D, E and F who are going to indirectly participate in the video conference.

Figure 8A:
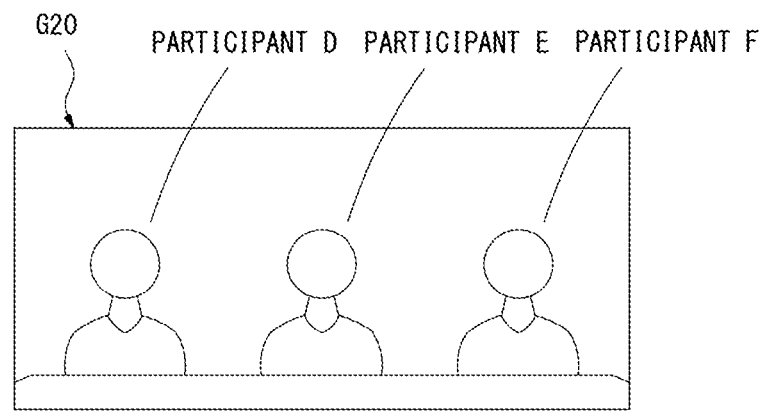
FIGS. 8A and 8B show an example of a face detection processing.
Figure 8B:
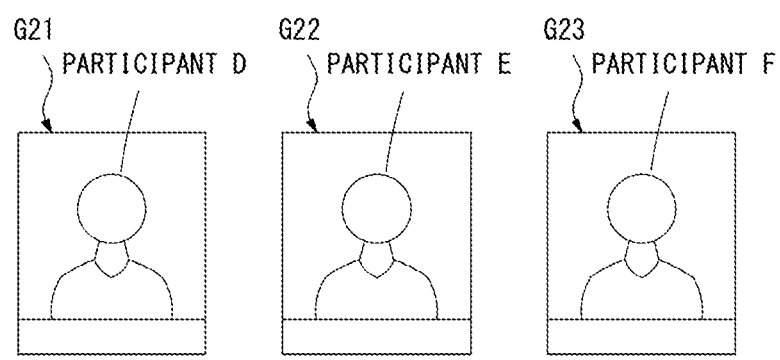

When image photographing by the camera 6 is started, the cooperation application 40 brings the second participant information generator 42 into operation. The second participant information generator 42 performs a face detection processing on the second photographed image obtained from the camera 6 and extracts the face image from the second photographed image (step S24). FIGS. 8A and 8B show an example of the face detection processing. For example, as shown in FIG. 8A, a photographed image G20 photographed by the camera 6 of the location Pc includes images of three participants D, E and F. The second participant information generator 42 performs the face detection processing on the aforementioned photographed image G20, and extracts face images G20, G22, and G23 of the respective participants D, E and F from the photographed image G20 as shown in FIG. 8B. After the second participant information generator 42 extracts the face images G21, G22 and G23 by the face detection processing, it transmits the extracted face images G21, G22, G23 as the identification target information to the sever 3 and enables the identifying unit 14 of the sever 3 to perform processing for identifying the second participant.

When the server 3 obtains the face image from the information processing device 2c, the server 3 brings the identifying unit 14 into operation and executes a participant identifying process for identifying the second participant by searching the database 4 (step S25). By this participant identifying process, it is identified that each of the face images G21, G22 and G23 is corresponding to the respective participants D, E, and F. When the second participant is identified by the identifying unit 14, the sever 3 transmits the identification result to the information processing device 2c. As a result, the information processing device 2c can automatically identify who are the participants D, E and F who are attending in the conference room together with the participant C. In this case, it is not necessary for the information processing device 2c to enable the participant C to perform an input operation of the identification information related to the participants D, E and F.

After identifying the participants D, E and F based on the face images obtained from the information processing device 2c, it is preferable that the servers 3 authenticates whether the participants D, E and F are the participants registered in the reservation information of the video conference, and transmits the identification result to the information processing device 2c if the authentication results in success. When the authentication results in failure, it is preferable that the sever 3 notifies the information processing device 2c that the participants D, E and F are not registered as participants of the video conference.

When the photographing function of the camera 6 is off in the information processing device 2c, the participants D, E and F are not photographed. Thus, the second participant information generator 42 uses, for example, an image designated by the participant C as the second participant image showing each of the participants D, E and F. The second participant information generator 42, for instance, enables the participant C to perform the input operation for the identification information on the participants D, E and F and transmits the first participant information D1 including the second participant image and the identification information input by the participant C to the sever 3. The server 3 then is enabled to identify the participants D, E and F based on the identification information input by the participant C. The sever 3 is enabled to authenticate whether or not the participants D, E and F are the participants registered in the reservation information of the video conference.

When the photographing function of the camera 6 is on, the information processing device 2c can identify the participants D, E and F. After the identification, the information processing device 2c then generates the second participant image showing each of the participants D, E and F based on the second photographed image photographed by the camera 6 and transmits the second participant information D2 including the second participant image and the identification information to the sever 3 (step S26). The second participant information generator 42 uses, for example, the face images G21, G22 and G23 of the respective participants D, E, and F extracted from the second photographed image G20 as the second participant images. Furthermore, when transmitting the second participant image showing each of the participants D, E and F to the sever 3, the second participant information generator 42 transmits the second participant images with the names of the respective participants D, E and F added thereto. As a result, the sever 3 can associate the second participant image received from the information processing device 2c with the name of the participant.

Upon obtaining the second participant images corresponding to the respective participants D, E and F from the information processing device 2c, the sever 3 updates the conference screen by arranging the second participant images together with the first participant images related to the participants A, B and C in the participant display area R3, and transmits the updated conference screen to the information processing devices 2a, 2b and 2c (step S27). After obtaining the updated conference screen from the sever 3, the information processing devices 2a and 2b enable the display unit 24 to display the conference screen (step S28). Upon obtaining the conference screen from the sever 3, the information processing device 2c also enables the display unit 24 to display the conference screen (step S29). Thus, the participants A and B participating in the video conference at the locations Pa and Pb different from the location Pc can know that the participants D, E and F have participated in the video conference.

Figure 9:
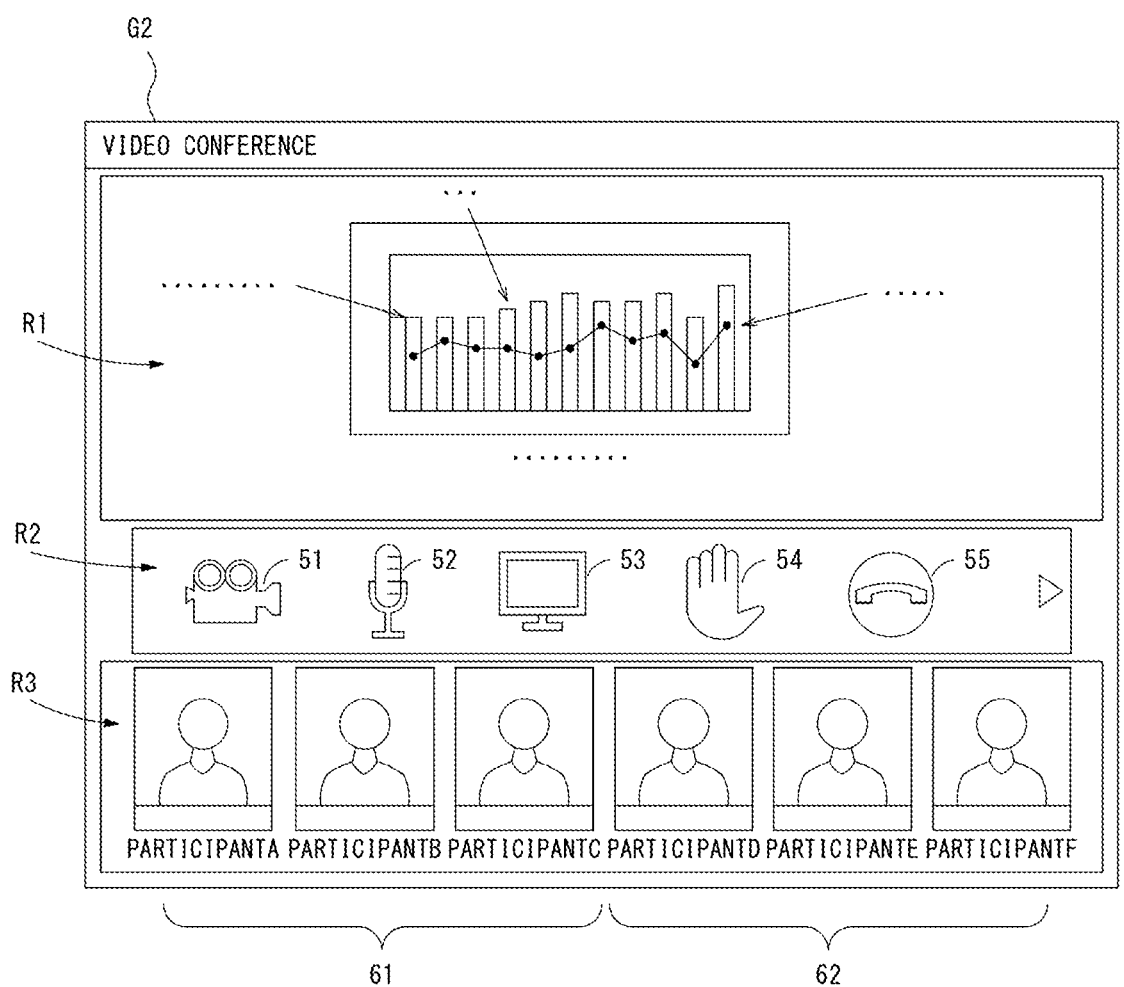
FIG. 9 illustrates an example of the conference screen on which second participants are additionally displayed.

FIG. 9 illustrates an example of the conference screen G2 on which the second participants are additionally displayed. In the participant display area R3 of the conference screen G2, the first participant images 61 showing each of the participants A, B and C who directly participate in the video conference and second participant images 62 showing each of the participants D, E and F who indirectly participate in the video conference are displayed. When arranging the second participant images obtained from the information processing device 2c in the participant display area R3, the display controller 17 of the sever 3 adds the names of the participants D, E and F. As a result, in the participant display area R3 of the conference screen G1 displayed in each information processing device 2a, 2b and 2c, each of the names of the participants D, E and F is displayed together with the image corresponding to the participants D, E and F. Therefore, the participants A and B participating in the video conference in the locations Pa and Pb different from the location Pc can know that the participants D, E and F also participate in the video conference.

As described above, the conferencing system 1 of the present embodiment is enabled to incorporate the image corresponding to each of the participants D, E and F who indirectly participate in the video conference into the conference screen as well as the images of the participants A, B and C who directly participate in the video conference using the information processing device 2 and to display the conference screen in the information processing device 2 of each location Pa, Pb and Pc. Therefore, the participants A and B who directly participate in the video conference in the locations Pa and Pb different from the conference room of the location Pc can know that not only the participant C who directly participates in the video conference in another location Pc but also the participants D, E and F participate in the video conference. Thus, all the participants can smoothly conduct the remote conference.

Figure 10:
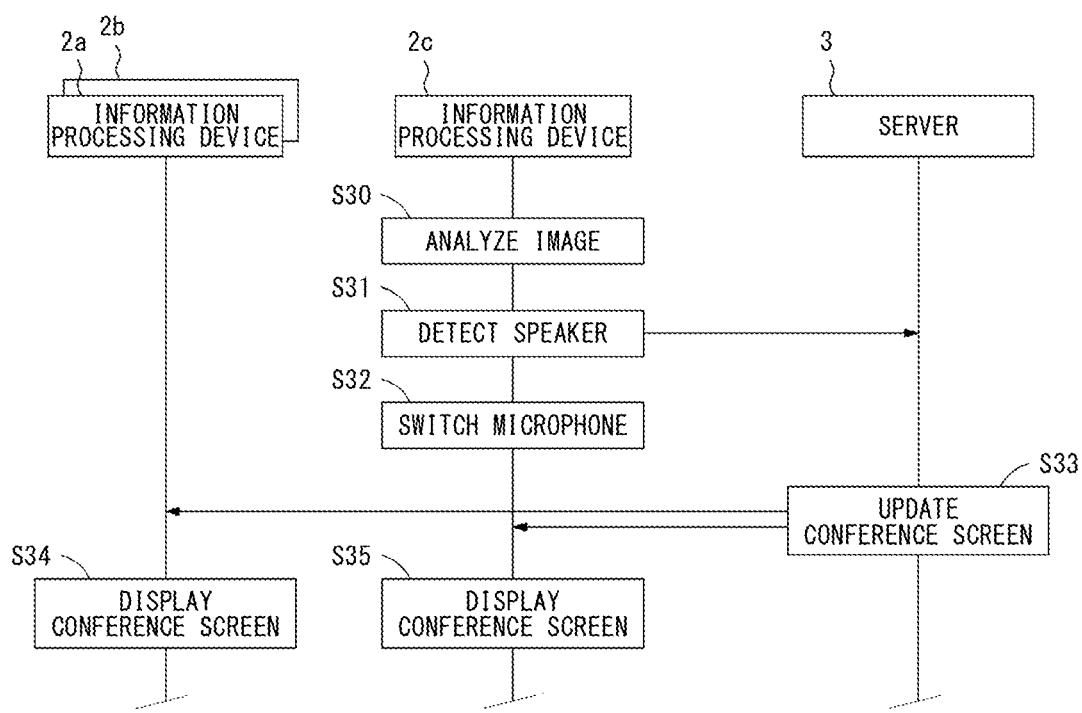
FIG. 10 is a third flow diagram illustrating an exemplary process sequence performed by the conferencing system.

Next, FIG. 10 is a third flow diagram illustrating an exemplary process sequence performed by the conferencing system 1 according to the present embodiment. The third flow diagram shows a flow of detecting, as speakers, the participants D, E and F indirectly participating in the video conference in the conference room at the location Pc. For example, when the voice information is obtained from the information processing device 2a, the server 3 is enabled to identify that the speaker is the participant A as the input source of the voice information is the information processing device 2a. When the voice information is obtained from the information processing device 2b, the server 3 is enabled to identify that the speaker is the participant B as the input source of the voice information is the information processing device 2b. When the voice information is obtained from the information processing device 2c, the sever 3 is enabled to detect that the input source of the voice information is the information processing device 2c but cannot accurately identify which of the participants C, D, E and F is the speaker. Therefore, the conferencing system 1 of the present embodiment performs processing based on the third flow diagram illustrated in FIG. 10 to enable the server 3 to identify the speaker. The process in the third flow diagram shown in FIG. 10 enables the second photographed image obtained by the camera 6 to be analyzed so that the speaker is detected. The photographing function of the camera 6, therefore, should be turned on.

When the participants A, B, C, D, E and F participate and the video conference is started based on the second flow diagram, the information processing device 2c brings the image analyzing unit 43 of the cooperation application 40 into operation. The image analysis unit 43 brings the speaker detector 44 into operation at the time of activation of the cooperation application 40, and continuously performs the image analysis on the second participant image sequentially generated as the moving image (step S30). That is, as the participants D, E and F participate in the video conference, the speaker detector 44 continuously performs a process of analyzing the movement of the mouth of the participants D, E and F based on the second participant images, and constantly determines whether or not the participant is the speaker. As a result, when the speaker is detected by the speaker detector 44, the information processing device 2c notifies the server 3 that the speaker has been detected (step S31). For the notification, the information processing device 2c adds the identification information that enables which of the participants D, E and F is the speaker to be identified.

When the speaker is detected by the speaker detector 44, the information processing device 2c brings the voice switching part 47 of the voice obtaining unit 46 into operation. The voice switching part 47 turns on the power supply of the microphone installed near the second participant detected as the speaker by the speaker detector 44 among the multiple microphones 8d, 8e and 8f. The voice switching part 47 turns off the power supply of the other microphones (step S32). The information processing device 2c may also switch off the power supply of the microphone 22 of the device body.

While the server 3 are obtaining the voice information from the information processing device 2c, the server 3 may be notified that any one of the participants D, E and F is the speaker from the information processing device 2c. In this case, the server 3 identify the speaker based on the notification. Then, the server 3 brings the display controller 17 of the conference screen providing unit 12 into operation to update the conference screen (step S33). To be more specific, when the speaker is detected from among the second participants, the display controller 17 enables the second participant image 62 corresponding to the second participant detected as the speaker to be highlighted in the participant display area R3.

Figure 11:
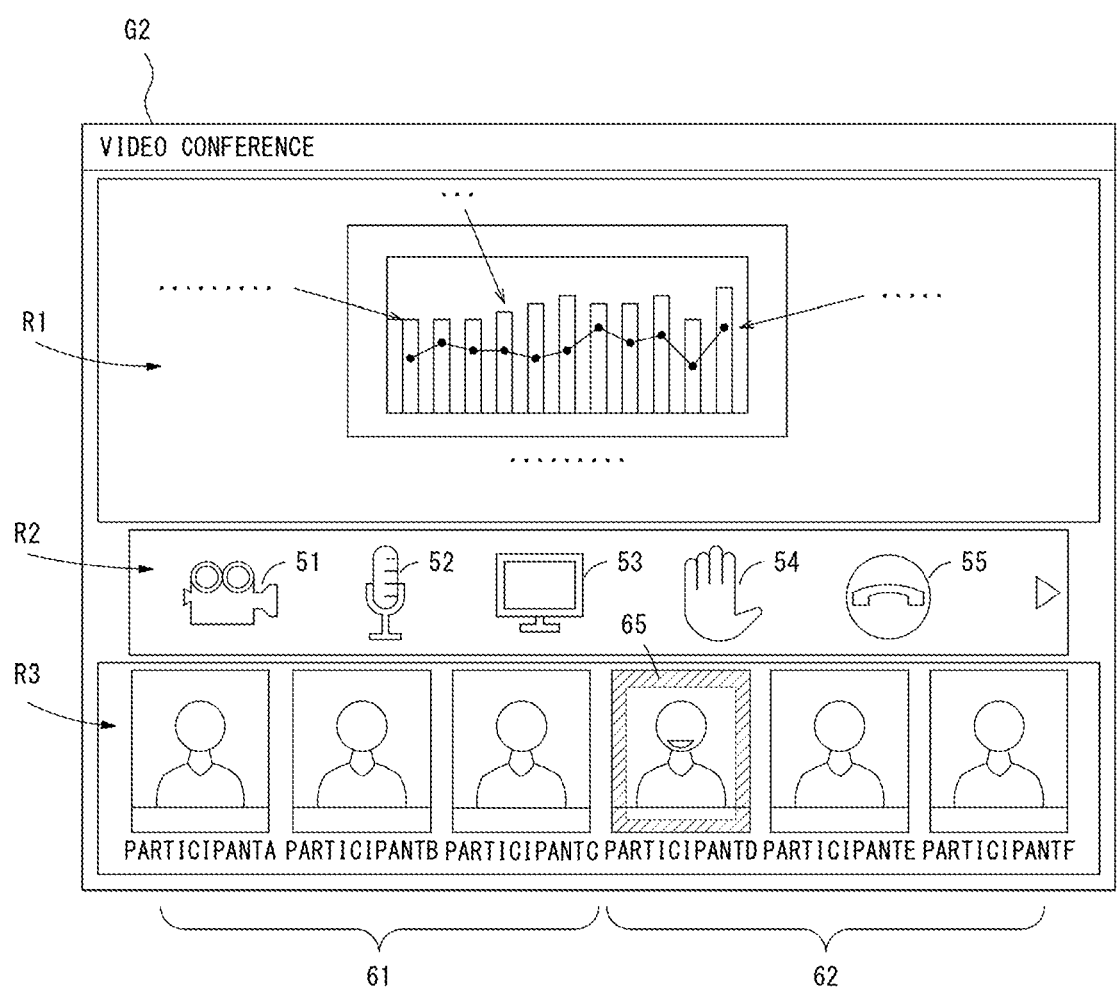
FIG. 11 illustrates an example of the conference screen in which a speaker is highlighted.

FIG. 11 illustrates an example of the conference screen G2 in which the speaker is highlighted. In the example of FIG. 11, the participant D is detected as the speaker. For example, when the information processing device 2c notifies that the participant D is the speaker, the sever 3 highlights the second participant image 62 corresponding to the participant D displayed in the participant display area R3 as shown in FIG. 11. In the illustrated example, the second participant image 62 corresponding to the participant D is highlighted by displaying an image frame 65 in a predetermined color and a predetermined thickness around the second participant image 62 corresponding to the participant D. However, the aspect of the highlighted display is not limited thereto. As described above, when the server 3 obtains the voice information from the information processing device 2c, the server 3 determines which of the participants D, E and F is the speaker based on the notification from the information processing device 2c, and highlights the second participant image 62 corresponding to the second participant who is the speaker.

When the participant C speaks in the conference room of the location Pc, the speaker detector 44 does not detect the speaker from among the participants D, E and F. In this case, the information processing device 2c does not notify the server 3 of the detection of the speaker. Therefore, when the sever 3 obtains the voice information from the information processing device 2c and does not receive the notification that the speaker has been detected from the information processing device 2c, it can be identified that the speaker is the participant C. Therefore, in this case, the server 3 updates the conference screen to a state in which the first participant image 61 corresponding to the participant C is highlighted.

When updating the conference screen G2 based on the notification from the information processing device 2c, the server 3 transmits the updated conference screen G2 to the information processing devices 2a, 2b and 2c. Upon obtaining the updated conference screen G2 from the sever 3, the information processing devices 2a and 2b enables the display unit 24 to display the conference screen (step S34). Upon obtaining the conference screen G2 from the sever 3, the information processing device 2c also enables the display unit 24 to display the conference screen G2 (step S35). Thus, the participants A and B participating in the video conference in the locations Pa and Pb different from the location Pc can recognize that the participant D indirectly participating in the video conference is speaking.

Figure 12:
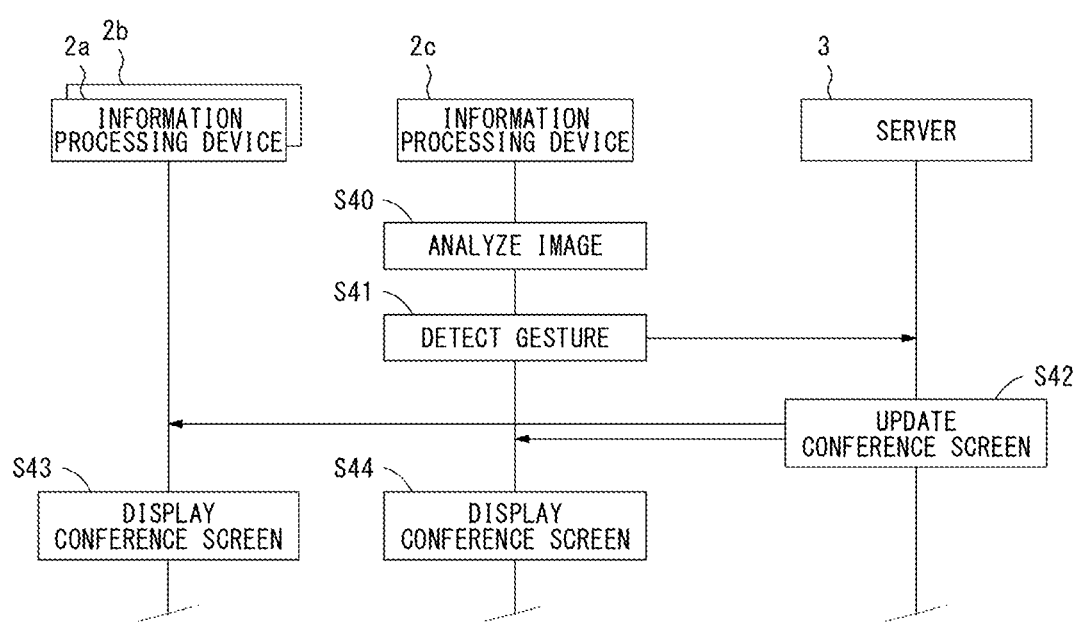
FIG. 12 is a fourth flow diagram illustrating an exemplary process sequence performed by the conferencing system.

FIG. 12 is a fourth flow diagram illustrating an exemplary process sequence performed by the conferencing system 1 according to the present embodiment. The fourth flow diagram illustrates a flow of detecting a hand raising gesture of the participants D, E and F who are indirectly participating in the video conference in the conference room in the location Pc. For example, when the participants A, B and C who are directly participating in the video conference using his or her information processing device 2a, 2b or 2c tries to speak up, he or she can operate the icon 54 displayed in the icon display area R2 to indicate the raise-hand gesture to another participant. To be more specific, when the server 3 detects that the icon 54 is operated in any of the information processing devices 2a, 2b and 2c, the server 3 can specify which of the participant A, B or C indicates the hand raising gesture. On the other hand, the participants D, E and F who are indirectly participating in the video conference cannot perform such an icon operation. Therefore, the conferencing system 1 according to the present embodiment carries out the processing based on the fourth flow diagram illustrated in FIG. 12 to enable the server 3 to detect the hand raising gesture of the participants D, E and F. The processing based on the fourth flow diagram is also carried out if the photographing function of the camera 6 is turned on.

When the participants A, B, C, D, E and F participate and the video conference is started based on the second flow diagram, the information processing device 2c brings the image analyzing unit 43 of the cooperation application 40 into operation. The image analyzing unit 43 brings the gesture detector 45 into operation at the time of the activation of the cooperation application 40, and continuously performs image analysis on the second participant image sequentially generated as the moving image (step S40). That is, as the participants D, E and F participate in the video conference, the gesture detector 45 continuously performs a process of analyzing the movement of the hand around the face images of the participants D, E and F based on the second participant image, and constantly determines whether or not the hand raising gesture is performed. As a result, when the gesture detector 45 detects the hand raising gesture, the information processing device 2c notifies the server 3 of the detection of the hand raising gesture (step S41). The information processing device 2c makes the notification by adding the identification information that enables to identify which of the participants D, E and F has performed the hand raising gesture.

When the information processing device 2c notifies the server 3 that the hand raising gesture is performed by any of the participants D, E and F, the sever 3 specifies the participant who performs the hand raising gesture based on the notification. The server 3 brings the display controller 17 of the conference screen providing unit 12 into operation to update the conference screen (step S42). More specifically, the display controller 17 enables the second participant image 62 corresponding to the second participant whose hand raising gesture is detected to be highlighted in the participant display area R3.

Figure 13:
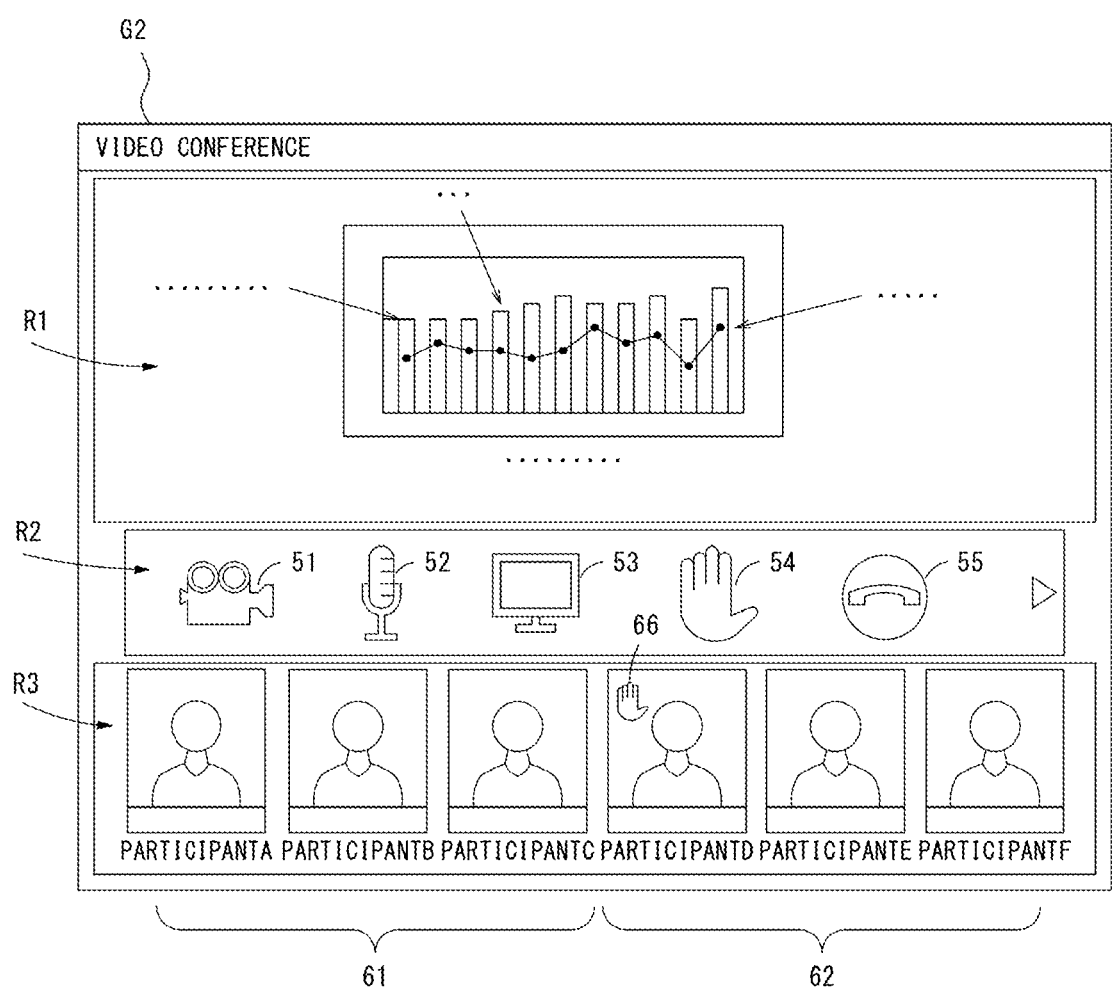
FIG. 13 illustrates an example of the conference screen in which the second participant performing a hand raising gesture is highlighted.

FIG. 13 illustrates an example of the conference screen G2 in which the second participant performing the hand raising gesture is highlighted. FIG. 13 illustrates an example when the hand raising gesture by the participant D is detected. For example, when the information processing device 2c notifies that the hand raising gesture by the participant D is detected, the server 3 highlights the second participant image 62 corresponding to the participant D displayed in the participant display area R3 as shown in FIG. 13. In the illustrated example, the hand raising icon 66 is added to the second participant image 62 corresponding to the participant D so that the second participant image 62 corresponding to the participant D is emphatically displayed. However, the aspect of the highlighted display is not limited thereto. As described above, the sever 3 determines, during the progress of the video conference, which of the participants D, E and F has performed the hand raising gesture on the basis of the notification from the information processing device 2c, and highlights the second participant image 62 corresponding to the second participant who has performed the hand raising gesture.

When updating the conference screen G2 based on the notification from the information processing device 2c, the server 3 transmits the updated conference screen G2 to the information processing devices 2a, 2b and 2c. Upon obtaining the updated conference screen G2 from the sever 3, the information processing devices 2a and 2b displays the conference screen on the display unit 24 (step S43). Upon obtaining the conference screen G2 from the sever 3, the information processing device 2c also displays the conference screen G2 on the display part 24 (step S44). Thus, the participants A and B participating in the video conference in the locations Pa and Pb different from the location Pc can recognize that the participant D indirectly participating in the video conference is performing the hand raising gesture.

As described above, when the conferencing system 1 according to the present embodiment performs the video conference by connecting the multiple information processing devices 2a, 2b and 2c to the server 3, the conferencing system 1 can generate the first participant information D1 related to participants A, B and C who directly participate in the video conference using each of the multiple information processing devices 2a, 2b and 2c. The conferencing system 1 then arranges the first participant information D1 in the participant display area R3 of the conference screen, and enables the conference screen to be displayed on each information processing device 2a, 2b and 2c. When there are the participants D, E and F who indirectly participate in the video conference together with the participant C who directly participates in the video conference using the information processing device 2, the conferencing system 1 can generate the second participant information D2 related to those participants D, E and F. The conferencing system 1 arranges the second participant information D2 in the participant display area R3 of the conference screen in the same manner as the first participant information D1, and enables the conference screen to be displayed on each information processing device 2a, 2b and 2c.

Hence, the conferencing system 1 according to the present embodiment is enabled to display not only the participants A, B and C who directly participate in the video conference by using the respective information processing devices 2a, 2b and 2c but also the participants D, E and F who indirectly participate in the video conference without using the information processing device 2 as the participants on the conference screen. Each participant who participates in the video conference in the different locations can recognize all of the other participants, and the video conference can smoothly be proceeded. To be more specific, the conferencing system 1 according to the present embodiment enables to take the participants D, E and F who do not use the information processing devices 2a, 2b and 2c into the video conference platform of the server 3. The conferencing system 1 is also enabled that the participants A, B and C who participate in the video conference by using the information processing devices 2a, 2b and 2c and the participants D, E and F who indirectly participate in the video conference without using the information processing device 2a, 2b or 2c to be dealt in the same manner.

When the participants D, E and F who are indirectly participating in the video conference speaks, the conferencing system 1 of the present embodiment automatically detects which of the participants D, E and F is the speaker, and highlights the second participant image corresponding to the second participant detected as the speaker. Even when the participant D, E or F who is indirectly participating in the video conference speaks, the participants A, B and C who are directly participating in the video conference can identify who speaks by checking the conference screen.

When the participant D, E or F who indirectly participates in the video conference performs the hand raising gesture, the conferencing system 1 of the present embodiment automatically detects which of the participants D, E and F has performed the hand raising gesture, and highlights the second participant image corresponding to the second participant who has performed the hand raising gesture. Therefore, when the participant D, E or F who is indirectly participating in the video conference performs the hand raising gesture, the participants A, B and C who are directly participating in the video conference can recognize who is about to speak by visually recognizing the conference screen.

In the above-described example, when the photographing function of the camera 6 connected to the information processing device 2c is on, the information processing device 2c obtains the second photographed image from the camera 6 and generates the second participant information 2c corresponding to each of the participants D, E and F who indirectly participate in the video conference. However, the server 3 may carry out the process of generating the second participant information D2. More specifically, the camera controller 41 of the information processing device 2c transmits the second photographed image photographed by the camera 6 to the sever 3 as it is, and the sever 3 generates the second participant information D2 corresponding to each of the participants D, E and F based on the second photographed image. In this case, the second participant information generator 42 described above is equipped with the server 3.

Figure 14:
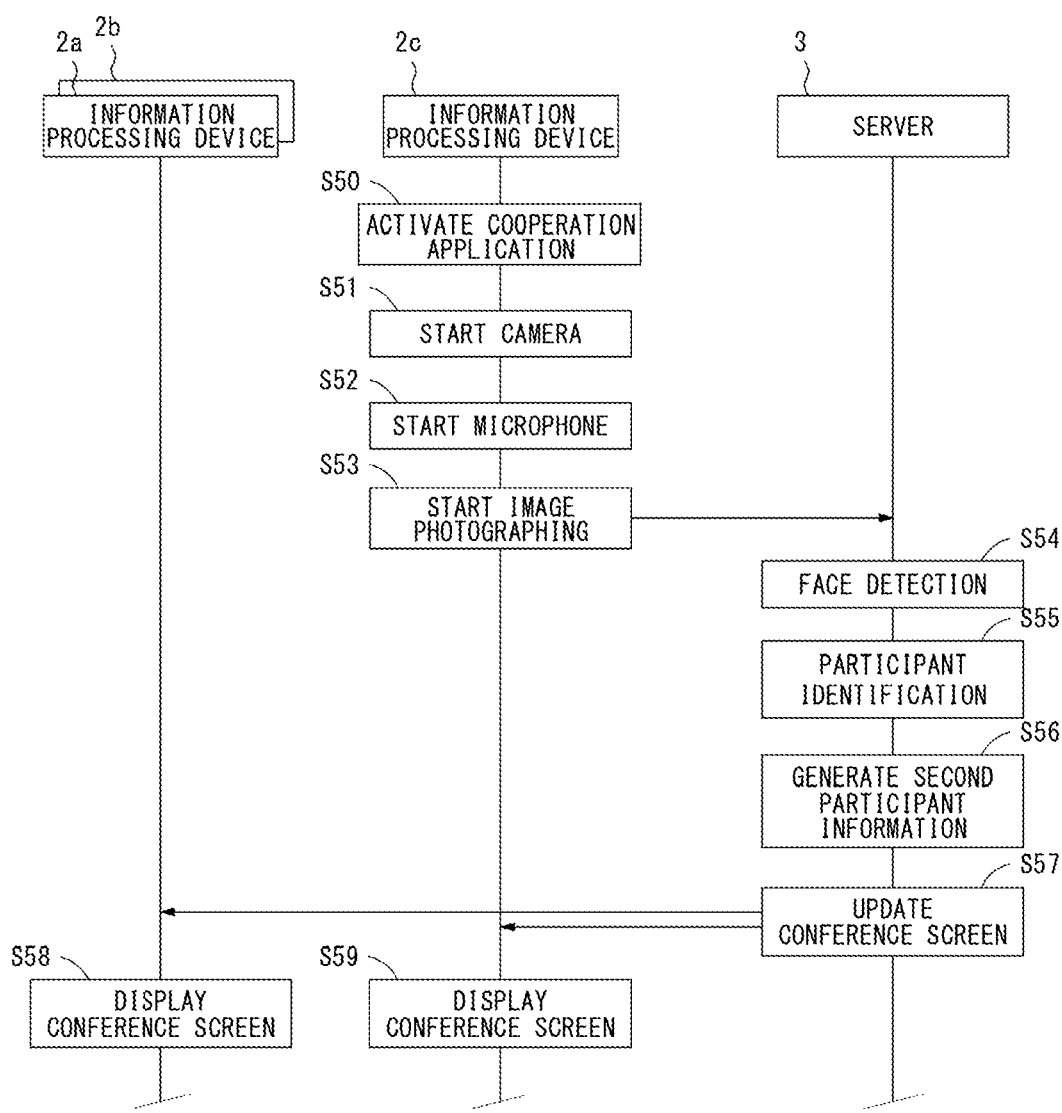
FIG. 14 is a flow diagram illustrating an exemplary process sequence performed by the server for generating a second participant image.

FIG. 14 is a flow diagram illustrating an exemplary process sequence performed by the server 3 for generating the second participant information D2 of the participants D, E and F. That is, the flow diagram shown in FIG. 14 is an alternative to the second flow diagram shown in FIG. 7. The flow diagram shown of FIG. 14 shows, for example, a flow of additionally displaying, as participants, the participant D, E and F who indirectly participate in the video conference in a state where the participants A, B and C log in to the sever 3.

First, the participant C who directly participates in the video conference in the conference room of the location Pc operates his or her information processing device 2c to activate the cooperation application 40 (step S50). Next, the cooperation application 40 starts the camera 6 connected to the device connector 26 (step S51) and further starts the microphones 8d, 8e and 8f (step S52). The cooperation application 40 then brings the camera controller 41 into operation and starts image photographing by the camera 6 (step S53). As a result, the information processing device 2c obtains the second photographed image obtained by photographing the participants D, E and F who are going to indirectly participating in the video conference. The cooperation application 40 transmits the second photographed image obtained by the camera 6 to the server 6.

Upon obtaining the second photographed image from the information processing device 2c, the sever 3 performs the face detection processing on the second photographed image, and extracts the face images of the participants D, E and F from the second photographed image (step S54). The server 3 brings the identifying unit 14 into operation and carries out the participant identifying process for identifying the second participants by searching the database 4 (step S55). By this participant identifying process, each participant D, E and F appearing in the second photographed image can be identified. When the second participant is identified by the identifying unit 14, the server 3 brings the second participant information generator 42 into operation and generates the second participant information D2 corresponding to each of the participants D, E and F based on the second photographed image obtained from the information processing device 2c (step S56). The second participant information generator 42 uses, for example, the face image of each of the participants D, E and F extracted from the second photographed image G20 as the second participant image. The second participant information generator 42 also adds each name of the participant D, E and F to the respective face images of the participants D, E and F.

The server 3 then brings the display controller 17 of the conference screen providing unit 12 into operation, and arranges the second participant images 62 of the participants D, E and F together with the first participant images 61 of the participants A, B and C in the participant display area R3 to update the conference screen. The server 3 transmits the updated conference screen to the information processing devices 2a, 2b and 2c (step S57). Upon obtaining the updated conference screen from the sever 3, the information processing devices 2a and 2b displays the conference screen on the display unit 24 (step S58). Upon obtaining the conference screen from the sever 3, the information processing device 2c also displays the conference screen on the display unit 24 (step S59). The conference screen displayed on each information processing device 2a, 2b and 2c is the same as that shown in FIG. 9. Hence, the participants A and B participating in the video conference in the locations Pa and Pb different from the location Pc can recognize that the participants D, E and F have participated in the video conference.

The above description has mainly exemplified the case that the information processing device 3c detects the speech or the hand raising gesture by the participant D, E or F. However, the functions of the image analyzing unit 43 including the speaker detector 44 and the gesture detector 45 described above can also be equipped with the server 3. In this case, the camera controller 41 of the information processing device 2c transmits the second photographed image photographed by the camera 6 to the sever 3 without processing. Then, the server 3 performs the image analysis on the second photographed image obtained from the information processing device 2. That is, the sever 3 performs the image analysis by the speaker detector 44 and/or the gesture detector 45 and detects whether or not any one of the participants D, E and F who indirectly participate in the video conference is speaking or performing the hand raising gesture.

Figure 15:
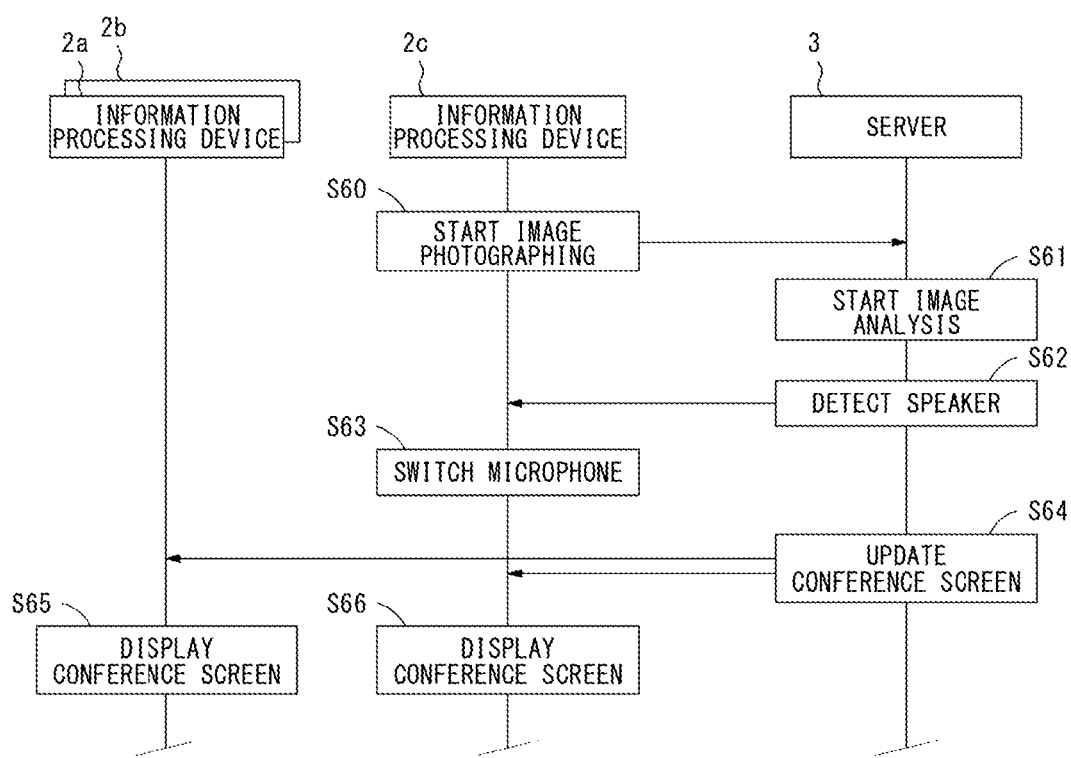
FIG. 15 is a flow diagram of detecting a speaker at the sever.

FIG. 15 is a flow diagram of detecting the speaker from among the participants D, E and F at the sever 3. The flow diagram shown in FIG. 15 is an alternative flow diagram to the third flow diagram shown in FIG. 10, and shows a flow of detecting any one of the participants D, E and F as the speaker in the sever 3.

Upon activating the camera 6 and starting the image photographing, the information processing device 2c transmits the second photographed image obtained by photographing the participants D, E and F, to the sever 3 (step S60). After obtaining the second photographed image from the information processing device 2c, the server 3 brings the speaker detector 44 of the image analyzing unit 43 into operation, and starts the image analysis on the second photographed image sequentially obtained from the information processing device 2c (step S61). That is, as the participants D, E and F participate in the video conference, the sever 3 continuously performs the processing of analyzing movement of the mouth of each participant D, E and F based on the second photographed image, and constantly determines whether or not the participant is the speaker. When detecting the speaker, the sever 3 notifies the information processing device 2c that the speaker has been detected (step S62). The sever 3 adds the identification information capable of identifying which one of the participants D, E and F is the speaker and notifies it.

Upon being notified of the speaker from the sever 3, the information processing device 2c brings the voice switching part 47 of the voice obtaining unit 46 into operation. The voice switching part 47 turns on the power of the microphone installed near the second participant detected as the speaker in the server 3 among the multiple microphones 8d, 8e and 8f and turns off the power of the other microphones (step S63). The information processing device 2c may also switch off the power supply of the microphone 22 of the device body.

When detecting that any of the participants D, E and F is the speaker, the sever 3 causes brings the display controller 17 of the conference screen providing unit 12 into operation and updates the conference screen (step S64). More specifically, when the speaker is detected from among the second participants, the display controller 17 highlights and displays the second participant image corresponding to the second participant detected as the speaker in the participant display area R3. The server 3 then transmits the updated conference screen G2 to each of the information processing devices 2a, 2b and 2c. Upon obtaining the updated conference screen G2 from the sever 3, the information processing devices 2a and 2b display the conference screen on the display part 24 (step S65). Upon obtaining the conference screen G2 from the sever 3, the information processing device 2c also displays the conference screen G2 on the display part 24 (step S66). Accordingly, the participants A and B participating in the video conference in the locations Pa and Pb different from the location Pc can recognize which of the participants D, E and F indirectly participating in the video conference is speaking.

Figure 16:
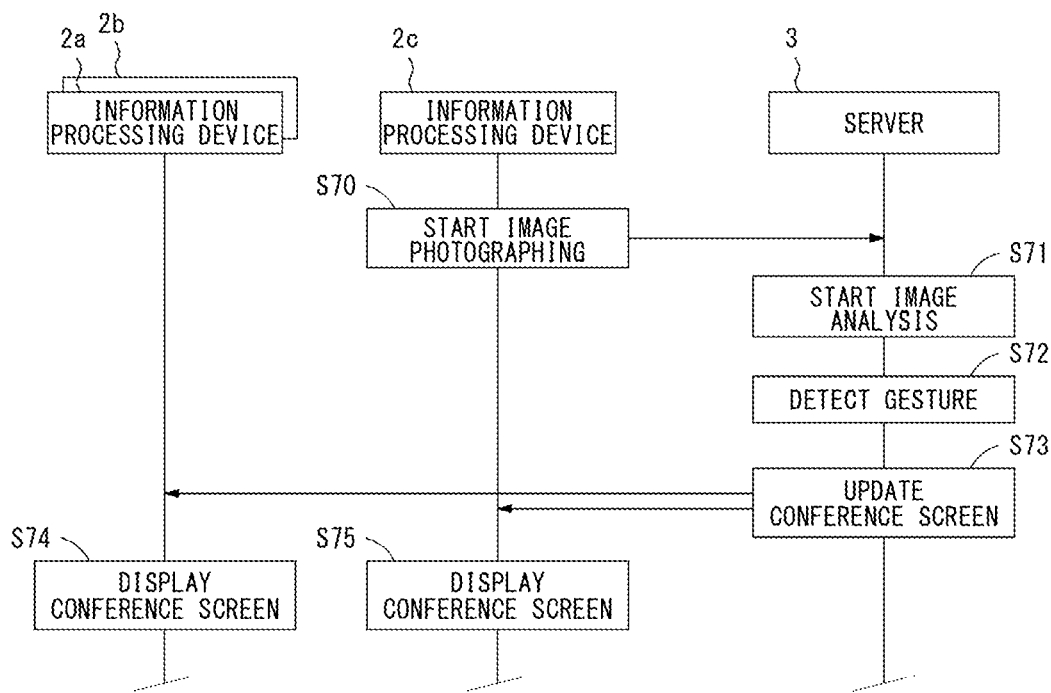
FIG. 16 is a flow diagram of detecting the hand raising gesture at the sever.

FIG. 16 is a flow diagram for detecting that one of the participants D, E and F has performed the hand raising gesture in the sever 3. To be more specific, the flow diagram shown in FIG. 16 is an alternative to the fourth flow diagram shown in FIG. 12. The flow diagram of FIG. 16 shows a flow of detecting that any one of the participants D, E and F makes the hand raising gesture in the server 3.

Upon activating the camera 6 and starting photographing images, the information processing device 2c transmits the second photographed image obtained by photographing the participants D, E and F to the sever 3 (step S70). After obtaining the second photographed image from the information processing device 2c, the server 3 brings the speaker detector 44 of the image analyzing unit 43 into operation, and starts the image analysis on the second photographed images obtained sequentially from the information processing device 2c (step S71). More specifically, as the participants D, E and F participate in the video conference, the sever 3 continuously performs the process of analyzing the movement of the hand around the face image of each participant D, E and F based on the second photographed images, and constantly determines whether or not the hand raising gesture is performed. As a result, when the hand raising gesture is detected, the server 3 identifies the participant who performs the hand raising gesture (step S72). Then, the server 3 brings the display controller 17 of the conference screen providing unit 12 into operation and updates the conference screen (step S73). More specifically, the display controller 17 highlights and displays the second participant image corresponding to the second participant whose hand raising gesture is detected in the participant display area R3. Then, the server 3 transmits the updated conference screen G2 to each of the information processing devices 2a, 2b and 2c. Upon obtaining the updated conference screen G2 from the sever 3, the information processing devices 2a and 2b displays the conference screen on the display unit 24 (step S74). Upon obtaining the conference screen G2 from the sever 3, the information processing device 2c also displays the conference screen G2 on the display unit 24 (step S75). Accordingly, the participants A and B participating in the video conference in the locations Pa and Pb different from the location Pc can recognize that one of the participants D, E and F indirectly participating in the video conference performs the hand raising gesture.

As described above, the conferencing system 1 according to the present embodiment may employ a structure that enables the server 3 to detect the speaker or the hand raising gesture.

Although embodiments of the present invention have been described and illustrated in detail, the disclosed embodiments are made for purposes of illustration and example only and not limitation. The scope of the present invention should be interpreted by terms of the amended claims.

(Modifications)

While the embodiment of the present invention has been described above, the present invention is not limited to the embodiment. Various modifications may be applied to the present invention.

For example, in the above-described embodiment, the camera 6 installed in the conference room at the location Pc is connected to the information processing device 2c, and the server 3 obtains the images photographed by the camera 6 via the information processing device 2c. However, the camera 6 may be connected to a network-connected device installed in, for example, the conference room, and transmit the photographed image directly to the server 3 via the network 5. In this case, the camera controller 41 described above is equipped with the server 3. The sever 3 directly controls the camera 6 via the network 5, thereby obtaining the second photographed image obtained by photographing the participants D, E and F.

The multiple microphones 8d, 8e and 8f installed in the conference room of the location Pc may be directly connected to the server 3 via the network 5. In this case, the voice obtaining unit 46 described above is equipped with the server 3.

Moreover, the display device 9 installed in the conference room of the location Pc may also be directly connected to the server 3 via the network 5. In this case, the conference screen providing unit 12 of the server 3 directly transmits the conference screen to the display device 9 via the network 5 so that the conference screen can be displayed on the screen 7 installed in the conference room.

Furthermore, in the above-described embodiment, when the photographing functions of the camera 21 and the camera 6 are turned on, names are given to the face images of the participants A, B, C, D, E and F extracted from the respective first photographed image and second photographed image, and the face images are displayed in the participant display area R3 in the conference screen. However, it is not essential to display the name of each participant as long as the face image of each participant A, B, C, D, E and F of is displayed. This is because, even when the name is not displayed, each participant can identify other participants by visually recognizing the face image displayed on the conference screen.

When the photographing function of the camera 21 or the camera 6 is off and the face image of each participant is not displayed in the participant display area R3, it is preferable to display the first participant image 61 and the second participant image 62 with the name of each participant attached thereto as described above. That is, the first participant image 61 or the second participant image 62 may be an image such as a silhouette image that simply takes the form of a human figure. Since it is difficult to identify the participant with just such image, it is preferable to display the participant image 61 or the second participant image 62 with the name attached thereto. When the photographing function of the camera 21 or the camera 6 is off, the first participant image 61 and/or the second participant image 62 may not be displayed in the participant display area R3, and only the name of each participant may be displayed in the participant display area R3.

In the example described in the embodiment, the conference screen on which the first participant image is displayed in the participant display area R3 is created at first, and the conference screen in which the second participant image is displayed in the participant display area R3 is created next. However, when creating the conference screen including the first participant image and the second participant image, it is not always necessary to perform the above-described two stage processing. For example, when the information processing device 2c simultaneously transmits the first participant information D1 related to the participant C and the second participant information D2 related to the participants D, E and F to the sever 3, the sever 3 creates the conference screen including both the first participant and the second participant and transmits the conference screen to the information processing devices 2a, 2b and 2c. As a result, the information processing device 2c is enabled to display the conference screen including both the first participant and the second participant by one stage processing.

In the above-described embodiment, a case where different processing is performed when the first participant makes the speech and when the second participant makes the speech has been described. However, the present invention is not limited to this. It is also possible to adopt a structure in which common processing is performed when the first participant speaks and when the second participant speaks. For example, when the information processing devices 2a, 2b and 2c detect a statement by the first participant via the microphone 22, the information processing devices 2a, 2b and 2c add information indicating that the first participant has made the statement to the first participant information D1 and transmits it to the sever 3. Based on the information included in the first participant information D1, the sever 3 can detect that the first participant has made the statement. As a result, the server 3 can highlight and display the first participant image 61 corresponding to the first participant who spoke.

On the other hand, when the information processing device 2c analyzes the second photographed image to detect that the second participant has spoken, the information processing device 2c adds information indicating that the second participant has spoken to the second participant information D2 and transmits it to the sever 3. Based on the information included in the second participant information D2, the sever 3 can detect that the second participant has made the statement. As a result, the server 3 can highlight and display the second participant image 62 corresponding to the second participant who spoke.

With the structure in which the common process is performed between the case where the first participant speaks and the case where the second participant speaks, the server 3 can apply the common process and apply to the conference screen regardless of which of the first participant and the second participant speaks, and thus there is an advantage that the common process program can be applied to the first participant and the second participant.

Moreover, in the example described in the above-described embodiment, different processing is performed in the case where the first participant performs the hand raising gesture and the case where the second participant performs the hand raising gesture. However, the present invention is not limited thereto. A structure may be adopted in which common processing is performed in the case where the first participant performs the hand raising gesture and, in the case, where the second participant performs the hand raising gesture. For example, when the information processing devices 2a, 2b and 2c detect the hand raising operation on the conference screen, the information processing devices 2a, 2b and 2c add information indicating that the first participant has performed the hand raising gesture to the first participant information D1 and transmits it to the sever 3. The server 3 can detect that the first participant has performed the hand raising gesture based on the information included in the first participant information D1. As a result, the server 3 can highlight and display the first participant image 61 corresponding to the first participant who has performed the hand raising gesture.

When the information processing device 2c detects that the second participant has performed the hand raising gesture by analyzing the second photographed image, the information processing device 2c adds information indicating that the second participant performed the hand raising gesture to the second participant information D2 and transmits the information to the server 3. The sever 3 can detect that the second participant has performed the hand raising gesture based on the information included in the second participant information D2. As a result, the server 3 can highlight and display the second participant image 62 corresponding to the second participant who has performed the hand raising gesture.

When the common process is performed between the case where the second participant performs the hand raising gesture and the case where the second participant performs the hand raising gesture as described above, the server 3 can apply the common process and apply to the conference screen regardless of whether the first participant or the second participant performs the hand raising gesture. Thus, there is an advantage that the common process program can be applied to the first participant and the second participant.

In the above-described embodiment, an example in which the speaker is detected by determining the face images of the participants D, E and F included in the second photographed image is described. However, the way of detecting the speaker is not necessarily limited to image analysis. For example, when a voice input of a predetermined level or more is detected in any one of the multiple microphones 8d, 8e and 8f, the participant located in the vicinity of the one microphone may be specified as the speaker.

In addition, in the above-described embodiment, the conferencing system 1 including the multiple microphones 8d, 8e and 8f assigned to each participant D, E and F who indirectly participates in the video conference is illustrated. However, such multiple microphones 8d, 8e and 8f are not essential to the conferencing system 1 of the present embodiment.

What is claimed is:

1. A conferencing system that is connected to multiple information processing devices over a network and provides each of the multiple information processing devices with a conference screen, the conferencing system comprising:

a participant information generator performing face detection processing to extract a face image associated with a first participant and a face image associated with a second participant based on an image captured by a first information processing device;

a first participant information obtaining unit that determines, based on the face image associated with the first participant, first participant information corresponding to the first participant, wherein the first participant, participates in a video conference by using the first information processing device;

a second participant information obtaining unit that determines, based on the face image associated with the second participant, second participant information related to the second participant, wherein the second participant indirectly participates in the video conference using the first information processing device; and a display controller that:
  displays the first participant information obtained by the first participant information obtaining unit in a first position providing first identification information on a predetermined display area on the conference screen; and
  displays the second participant information obtained by the second participant information obtaining unit in a second position providing second identification information on the predetermined display area on the conference screen, wherein the second position displays the second participant, wherein the first position and second position are different.

2. The conferencing system according to claim 1, wherein:
the first participant information includes a first participant image showing the first participant, and
the display controller displays the first participant image in the display area.

3. The conferencing system according to claim 2, further comprising:
a first photographing unit that photographs the first participant, wherein
the first participant information obtaining unit obtains the first participant image based on a first photographed image photographed by the first photographing unit.

4. The conferencing system according to claim 2, wherein:
when displaying the first participant image in the display area, the display controller adds a name of the first participant to the first participant image and displays the first participant image.

5. The conferencing system according to claim 1, wherein:
the second participant information includes a second participant image showing the second participant, and
the display controller displays the second participant image in the display area.

6. The conferencing system according to claim 5, further comprising:
a second photographing unit that photographs the second participant,
wherein the second participant information obtaining unit obtains the second participant image based on a second photographed image photographed by the second photographing unit.

7. The conferencing system according to claim 5, wherein, when displaying the second participant image in the display area, the display controller adds a name of the second participant to the second participant image to display.

8. The conferencing system according to claim 1, further comprising:
an identifying unit that identifies the second participant based on the second participant information.

9. The conferencing system according to claim 8, wherein the identifying unit searches a predetermined database based on the second participant information to identify the second participant.

10. The conferencing system according to claim 8, wherein the identifying unit identifies the second participant based on the second photographed image obtained by photographing the second participant included in the second participant information.

11. The conferencing system according to claim 10, wherein the identifying unit extracts a face image of the second participant based on the second photographed image, and identifies the second participant based on the face image.

12. The conferencing system according to claim 8, further comprising:
a speaker detector that detects a speaker from among the second participants identified by the identifying unit.

13. The conferencing system according to claim 12, wherein, when the speaker is detected by the speaker detector, the display controller highlights and displays the second participant information corresponding to the second participant detected as the speaker in the display area.

14. The conferencing system according to claim 12, wherein the speaker detector analyzes the face image of the second participant based on the second photographed image obtained by photographing the second participant included in the second participant information to detect the speaker.

15. The conferencing system according to claim 12, further comprising:
a voice input unit installed in the vicinity of the second participant; and
a voice switching unit that controls on and off of the voice input unit, wherein
the voice switching unit switches on the voice input unit installed in the vicinity of the second participant detected as the speaker when the speaker is detected by the speaker detector.

16. The conferencing system according to claim 8, further comprising:
a gesture detector that detects that the second participant identified by the identifying unit has performed a hand raising gesture.

17. The conferencing system according to claim 16, wherein, when the hand raising gesture is detected by the gesture detector, the display controller highlights and displays the second participant information corresponding to the second participant whose hand raising gesture is detected.

18. The conferencing system according to claim 16, wherein, when the hand raising gesture is detected by the gesture detector, the display controller adds a hand raising icon to the second participant information corresponding to the second participant whose hand raising gesture is detected and displays the second participant information.

19. The conferencing system according to claim 16, wherein the gesture detector analyzes the image of the second participant based on the second photographed image obtained by photographing the second participant, and detects the hand raising gesture.

20. A server that is connected to multiple information processing devices over a network and provides each of the multiple information processing devices with a conference screen, thereby supporting a video conference, comprising:
a participant information generator performing face detection processing to extract a face image associated with a first participant and a face image associated with a second participant based on an image captured by a first information processing device;
a first participant information obtaining unit that determines, based on the face image associated with the first participant, first participant information corresponding to the first participant, wherein the first participant participates in the video conference by using the first information processing device;
a second participant information obtaining unit that determines, based on the face image associated with the second participant, second participant information related to, wherein the second participant indirectly participates in the video conference using the first information processing device; and
a display controller that:
displays the first participant information obtained by the first participant information obtaining unit in a first position providing first identification information on a predetermined display area on the conference screen; and
displays the second participant information obtained by the second participant information obtaining unit in a second position providing second identification information on the predetermined display area on the conference screen, wherein the second position displays the second participant, wherein the first position and the second position are different.

21. The server of claim 20, wherein:
the first participant information includes a first participant image showing the first participant, and
the display controller displays the first participant image in the display area.

22. The server of claim 20, wherein:
the second participant information includes a second participant image showing the second participant, and
the display controller displays the second participant image in the display area.

23. The server of claim 20, further comprising:
an identifying unit that identifies the second participant based on the second participant information.

24. The server of claim 23, wherein the identifying unit identifies the second participant based on a photographed image obtained by photographing the second participant included in the second participant information.

25. The server of claim 24, further comprising:
a speaker detector that detects a speaker from among the second participants identified by the identifying unit, wherein
the speaker detector analyzes a face image of the second participant included in the photographed image to detect the speaker.

26. The server of claim 25, wherein, when the speaker is detected by the speaker detector, the display controller highlights and displays the second participant information corresponding to the second participant detected as the speaker in the display area.

27. The server of claim 24, further comprising:
a gesture detector that detects that the second participant identified by the identifying unit has performed a hand raising gesture, wherein the gesture detector analyzes an image of the second participant included in the photographed image, and detects the hand raising gesture.

28. The server of claim 27, wherein, when the hand raising gesture is detected by the gesture detector, the display controller highlights and displays the second participant information corresponding to the second participant whose hand raising gesture is detected.

29. The server of claim 27, wherein, when the hand raising gesture is detected by the gesture detector, the display controller adds a hand raising icon to the second participant information corresponding to the second participant whose hand raising gesture is detected and displays the second participant information.

30. An information processing device that is connected to a server over a network and conducts a video conference using a platform for a video conference provided by the server, comprising:
 a first participant information generator that:
  performs face detection processing to extract a face image associated with a first participant based on an image captured by a first information processing device;
  generates, based on the face image associated with the first participant, first participant information corresponding to the first participant, wherein the first participant participates in the video conference by using the first information processing device; and
  transmits the first participant information to the server;
 a second participant information generator that:
  performs face detection processing to extract a face image associated with a second participant based on the image captured by the first information processing device;
  generates, based on the face image associated with the second participant, second participant information corresponding to the second participant, wherein the second participant indirectly participates in the video conference using the first information processing device; and
  transmits the second participant information to the server;
 a conference screen obtaining unit that obtains a conference screen in which the first participant information is displayed in a first position providing first identification information on a predetermined display area, and the second participant information is displayed in a second position providing second identification on the predetermined display area from the server, wherein the first position and the second position are different; and
 a display unit that displays the conference screen obtained by the conference screen obtaining unit.

31. The information processing device according to claim 30, further comprising:
 a first photographing controller that controls a first photographing unit that photographs the first participant; and
 a second photographing controller that controls a second photographing unit that photographs the second participant, wherein
 the first participant information generator generates the first participant information based on a first participant image obtained by the first photographing controller controlling the first photographing unit, and
 the second participant information generator generates the second participant information based on a second participant image obtained by the second photographing controller controlling the second photographing unit.

32. The information processing device according to claim 31, further comprising:
 a speaker detector that detects a speaker from among the second participants and notifies the server, wherein
 the speaker detector analyzes a face image of the second participant included in the second photographed image to detect the speaker.

33. The information processing device according to claim 31, further comprising:
 a gesture detector that detects that the second participant has performed a hand raising gesture and notifies the server, wherein
 the gesture detector analyzes the face image of the second participant included in the second photographed image, and detects the hand raising gesture.

34. A non-transitory recording medium storing a computer readable program to be executed by a hardware processor in a server that is connected to multiple information processing devices over a network and provides each of the multiple information processing devices with a conference screen, thereby supporting a video conference wherein the computer readable program causes the hardware processor executing the computer readable program to:
 perform face detection processing to extract a face image associated with a first participant and a face image associated with a second participant based on an image captured by a first information processing device;
 determine, based on the face image associated with the first participant, first participant information corresponding to the first participant, wherein the first participant, participates in the video conference by using the first information processing device;
 determine, based on the face image associated with the second participant, second participant information related to the second participant, wherein the second participant indirectly participates in the video conference using the first information processing device;
 displaying the determined first participant information in a first position providing first identification information on a predetermined display area on the conference screen, and
 displaying the determined second participant information in a second position providing second identification information on the predetermined display area on the conference screen, wherein the second position displays the second participant, and wherein the first position and the second position are different.

* * * * *